US010219100B2

(12) United States Patent
Luna

(10) Patent No.: US 10,219,100 B2
(45) Date of Patent: *Feb. 26, 2019

(54) DETERMINING PROXIMITY FOR DEVICES INTERACTING WITH MEDIA DEVICES

(71) Applicant: AliphCom, San Francisco, CA (US)

(72) Inventor: Michael Edward Smith Luna, San Jose, CA (US)

(*) Notice: Subject to any disclaimer, the term of this patent is extended or adjusted under 35 U.S.C. 154(b) by 99 days.

This patent is subject to a terminal disclaimer.

(21) Appl. No.: 13/919,307

(22) Filed: Jun. 17, 2013

(65) Prior Publication Data

US 2014/0370817 A1  Dec. 18, 2014

(51) Int. Cl.
*H04W 4/00* (2009.01)
*H04W 8/00* (2009.01)
*H04W 4/02* (2018.01)

(52) U.S. Cl.
CPC ........... *H04W 4/008* (2013.01); *H04W 4/023* (2013.01); *H04W 8/005* (2013.01)

(58) Field of Classification Search
CPC combination set(s) only.
See application file for complete search history.

(56) References Cited

U.S. PATENT DOCUMENTS

| 2013/0045680 | A1* | 2/2013 | Dua ........................... 455/41.1 |
| 2013/0154811 | A1* | 6/2013 | Ferren et al. ................ 340/12.5 |
| 2013/0211270 | A1* | 8/2013 | St. Laurent et al. ......... 600/508 |
| 2013/0214166 | A1* | 8/2013 | Barlow et al. ................ 250/342 |
| 2013/0331031 | A1* | 12/2013 | Palin et al. .................. 455/41.2 |
| 2014/0279889 | A1* | 9/2014 | Luna ........................... 707/626 |

* cited by examiner

*Primary Examiner* — Junpeng Chen

(57) ABSTRACT

Embodiments relate generally to electrical and electronic hardware, computer software, wired and wireless network communications, and portable and wearable media devices. Media devices may include RF transceivers and proximity sensors for detecting a user, another wireless device, or both that are positioned in proximity of the media device and take one or more actions upon detecting proximity. Activity, content, data, playlist, media playback, command, control, data or file synchronization, and other functions may be handled by the media device subsequent to detecting proximity of another device and/or user in proximity of the media device. Moreover, those functions may be transferred back to the another device when the another device moves out of a proximity range of the media device. RF signatures, RF signal strength, RSSI, and proximity detection sensors may be used to detect proximity, location, and presence (e.g., of a user or other persons) relative to the media device.

11 Claims, 13 Drawing Sheets

DETERMINING PROXIMITY FOR DEVICES INTERACTING WITH MEDIA DEVICES

CROSS-REFERENCE TO RELATED APPLICATIONS

This application is related to the following applications: U.S. patent application Ser. No. 13/831,422 filed on Mar. 14, 2013 and titled "PROXIMITY-BASED CONTROL OF MEDIA DEVICES" and U.S. patent application Ser. No. 13/802,646 filed on Mar. 13, 2013 and titled "Proximity-Based Control Of Media Devices For Media Presentations" and U.S. patent application Ser. No. 13/802,674 filed on Mar. 13, 2013 and titled "Proximity And Interface Controls Of Media Devices For Media Presentations" and U.S. patent application Ser. No. 13/831,485 filed on Mar. 14, 2013 and titled "MEDIA DEVICE CONFIGURATION AND ECOSYSTEM SETUP" and U.S. patent application Ser. No. 13/802,528 filed on Mar. 13, 2013 and titled "CLOUD-BASED MEDIA DEVICE CONFIGURATION AND ECOSYSTEM SETUP" and U.S. patent application Ser. No. 13/802,689 filed on Mar. 13, 2013 and titled "CHARACTERISTIC-BASED COMMUNICATIONS" and all of which are hereby incorporated by reference in their entirety for all purposes.

FIELD

Embodiments of the invention relate generally to electrical and electronic hardware, computer software, wired and wireless network communications, wearable, hand held, and portable computing devices for facilitating communication of information. More specifically, disclosed are an ecosystem of wirelessly interconnected media devices that may detect proximity of other wireless devices and automatically establish a wireless communications link with those other wireless devices and use the link to handle content, media, information, command, control, and other functions.

BACKGROUND

Conventional wireless devices, such as smartphones, tablets, pads, cellphones, PDA, laptops, portable games, touch screen devices, and the like typically require software and user intervention (e.g., via a GUI or the like) to make the wireless device interoperable with other devices, such as other wireless devices and systems. Some wireless device may even require the user to go through the same steps/actions to get the wireless device to interact with another device, even thou the user has previously configured the devices to interact with each other.

Ideally, a wireless device would sense its surrounding environment and the presence of other wireless devices and/or users, and based on content or programming, act to re-configure itself to serve a different role for a user until the circumstances change and the wireless device reverts back to its prior role or switches to yet another role. Moreover, the wireless device may be configured to take over (e.g., commandeers) one or more functions, tasks, etc. of another wireless device while the two wireless devices are within a predetermined proximity of one another. Additionally, it is desirable for some function of a wireless device to change in response to a location of another wireless device and/or a user relative to a position of the wireless device.

Thus, what is needed are devices, methods, and software that allow a media device to sense its environment, determine proximity and/or location of other devices and/or users, and then take some action upon detecting proximity and/or location of other devices and/or users.

BRIEF DESCRIPTION OF THE DRAWINGS

Various embodiments or examples ("examples") of the invention are disclosed in the following detailed description and the accompanying drawings. The drawings are not necessarily to scale.

DETAILED DESCRIPTION

Various embodiments or examples may be implemented in numerous ways, including as a system, a process, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
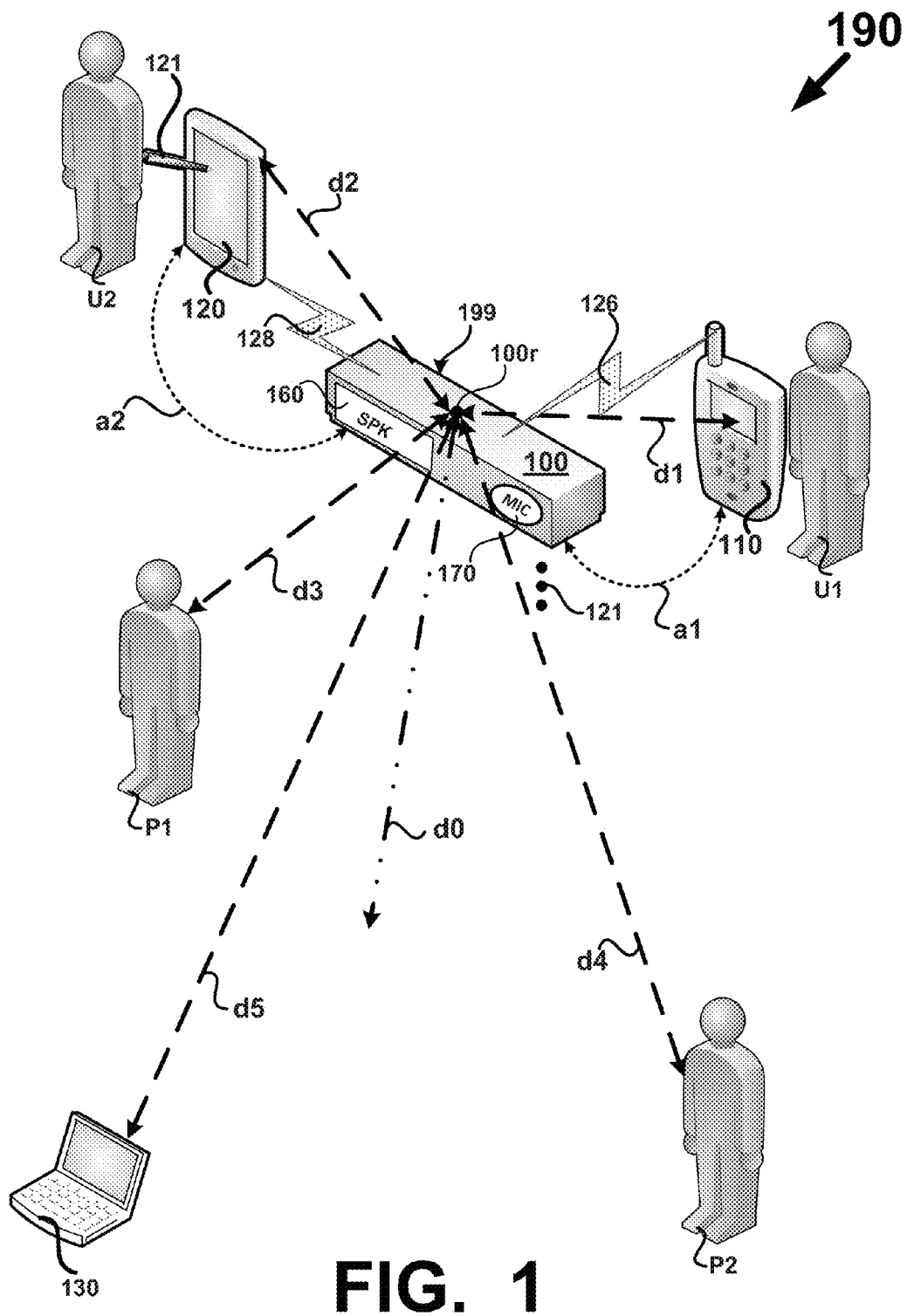
FIG. 1 depicts a block diagram of a media device and wireless devices and users/persons positioned around the media device according to an embodiment of the present application.

FIG. 1 depicts a block diagram 190 of a media device 100 and wireless devices and users and/or persons positioned around the media device 100. As will be described in greater detail below, media device 100 may include a plurality of systems such as an audio/video system that includes one or more speakers 160 and one or more microphones 170, a radio frequency (RF) system including a plurality of RF transceivers configured for wireless communications using a plurality of different wireless communications protocols, and a proximity sensing system. A chassis 199 may include the various components of media device 100. Although only one media device 100 is depicted, there may be additional media devices as denoted by 121. In FIG. 1 media device 100 is configured to use one or more of its systems to detect proximity and/or location of other wireless devices such as smart phone 110 and tablet 120. Each wireless device may be connected with, held, or otherwise associated with a user such as user U1 for 110 and user U2 for 120. Some wireless user devices may not be associated with a user, such as laptop 130 for example. Media device 100 may also be configured to detect proximity and/or location of animate objects, such as people, denoted as person P1 and person P2. The arrangement and number of user devices, users, and persons depicted in FIG. 1 is for purposes of illustration only and the actual number and arraignment of user devices, users, persons, or other animate objects is not limited to that depicted in FIG. 1 and may differ from what is depicted in FIG. 1. The user devices, users, persons, or other animate objects depicted in FIG. 1 may be positioned at different distances from media device 100. Here, an arbitrary reference point 100r on the media device 100 is used to illustrate variations in approximate distance between one object and the media device 100, with: user device 110 at distance d1; user device 120 at distance d2; P1 at a distance d3; P2 at a distance d4; and user device 130 at a distance d5. Although not depicted, users U1 and U2 may also be positioned at an approximate distance from media device 100.

At any given time some or all of the objects depicted in FIG. 1 may be positioned out of proximity of the media device 100 because their respective distance d is outside a proximity range of the media device 100 as denoted by a distance d0. For purposes of explanation, objects positioned approximately at or beyond d0 are outside of proximity detection range of media device 100. For example, person P2 and user device 130 are positioned beyond d0 as denoted by distances d4 and d5 respectively. Here d0 may represent a maximum proximity detection range for one or more systems of media device 100, such as a proximity sensing system. However, other systems of media device 100 may be configured to detect proximity of objects (e.g., user devices) beyond the distance d0, such as the aforementioned RF system. The proximity and RF systems will be described in greater detail below.

Media device 100 may be configured via hardware, software, or both to take some action in response to detecting proximity of other wireless devices, such as the user devices (110, 120), and/or proximity of objects such as (U1, U2, P1, P2). Here, media device 100, using its RF system, detects a wireless signature (e.g., a RF signature) of user devices 110 and 120. A RF signal strength of radio transmissions from the wireless systems of user devices 110 and 120 may be detected by the RF system of media device 100 and processed to determine proximity and/or location of one or more wireless devices, such as the user devices 110 and 120. After detecting one or more wireless devices, the media device 100 may establish a wireless communications link with one or more of those wireless devices. In FIG. 1, after detecting proximity, the RF system of media device 100 may analyze the RF signature of each wireless device to determine the wireless communications protocol(s) used by that device and determine if one of its RF transceivers is protocol compatible with the protocol(s) of each wireless device. If there is compatibility, then the RF system activates the appropriate RF transceiver and establishes a wireless communications link with the wireless device. For example, in FIG. 1, user device 120 may be wirelessly communicating using a wireless network protocol (e.g., IEEE 802.11a/b/g/n (WiFi)) and user device 110 may be wirelessly communicating using Bluetooth protocol (BT). A WiFi communications link 128 may be established by media device 100 with user device 120 and a BT communications link 126 may be established by media device 100 with user device 110. Temporally, the detecting of any of proximity, analyzing RF signal strength, RF signature need not occur at the same time and may be spread out over time for the one or more wireless devices that are encountered by media device 100. After establishing the wireless communications link, media device 100 may take one or more actions. For example, after establishing link 128 with user device 120, media device 100 may take an action a2 including but not limited to: accessing data from user device, transferring data to/from user device, taking total or partial control of user device, issue commands to user device, receive commands from user device, relinquish control to user device, download data from user device, access content on user device, service content on user device, access a playlist on user device, playback content from user device, cause an application to be downloaded/installed on user device, just to name a few. Similarly, after establishing link 126 with user device 110, media device 100 may take an action a1. Action a1 may be those described above for action a2.

Figure 2:
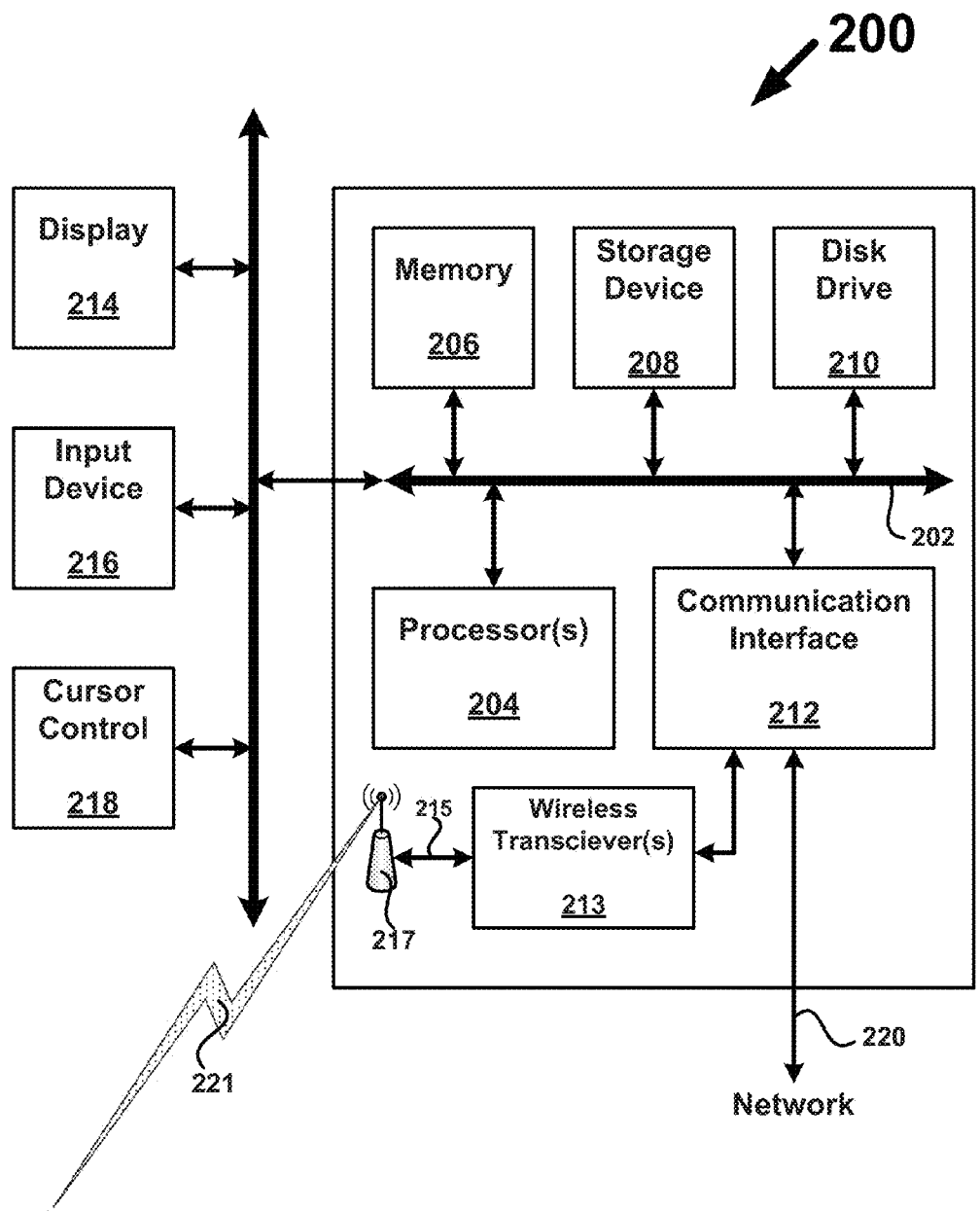
FIG. 2 illustrates an exemplary computer system according to an embodiment of the present application.

FIG. 2 illustrates an exemplary computer system 200 suitable for use in the system 190 depicted in FIG. 1. In some examples, computer system 200 may be used to implement computer programs, applications, configurations, methods, processes, or other software to perform the above-described techniques. Computer system 200 includes a bus 202 or other communication mechanism for communicating information, which interconnects subsystems and devices, such as one or more processors 204, system memory 206 (e.g., RAM, SRAM, DRAM, Flash), storage device 208 (e.g., Flash, ROM), disk drive 210 (e.g., magnetic, optical, solid state), communication interface 212 (e.g., modem, Ethernet, WiFi), display 214 (e.g., CRT, LCD, touch screen), input device 216 (e.g., keyboard, stylus), and cursor control 218 (e.g., mouse, trackball, stylus). Some of the elements depicted in computer system 200 may be optional, such as elements 214-218, for example and computer system 200 need not include all of the elements depicted.

According to some examples, computer system 200 performs specific operations by processor 204 executing one or more sequences of one or more instructions stored in system memory 206. Such instructions may be read into system memory 206 from another non-transitory computer readable medium, such as storage device 208 or disk drive 210 (e.g., a HD or SSD). In some examples, circuitry may be used in place of or in combination with software instructions for implementation. The term "non-transitory computer readable medium" refers to any tangible medium that participates in providing instructions to processor 204 for execution. Such a medium may take many forms, including but not limited to, non-volatile media and volatile media. Non-volatile media includes, for example, optical, magnetic, or solid state disks, such as disk drive 210. Volatile media includes dynamic memory, such as system memory 206. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 202 for transmitting a computer data signal. In some examples, execution of the sequences of instructions may be performed by a single computer system 200. According to some examples, two or more computer systems 200 coupled by communication link 220 (e.g., LAN, Ethernet, PSTN, or wireless network) may perform the sequence of instructions in coordination with one another. Computer system 200 may transmit and receive messages, data, and instructions, including programs, (i.e., application code), through communication link 220 and communication interface 212. Received program code may be executed by processor 204 as it is received, and/or stored in disk drive 210, or other non-volatile storage for later execution. Computer system 200 may optionally include a wireless transceiver 213 in communication with the communication interface 212 and coupled 215 with an antenna 217 for receiving and generating RF signals 221, such as from a WiFi network, BT radio, or other wireless network and/or wireless devices, for example. Examples of wireless devices include but are not limited to those depicted in FIG. 1 such as media device 100 and user devices 110 and 120.

Figure 3:
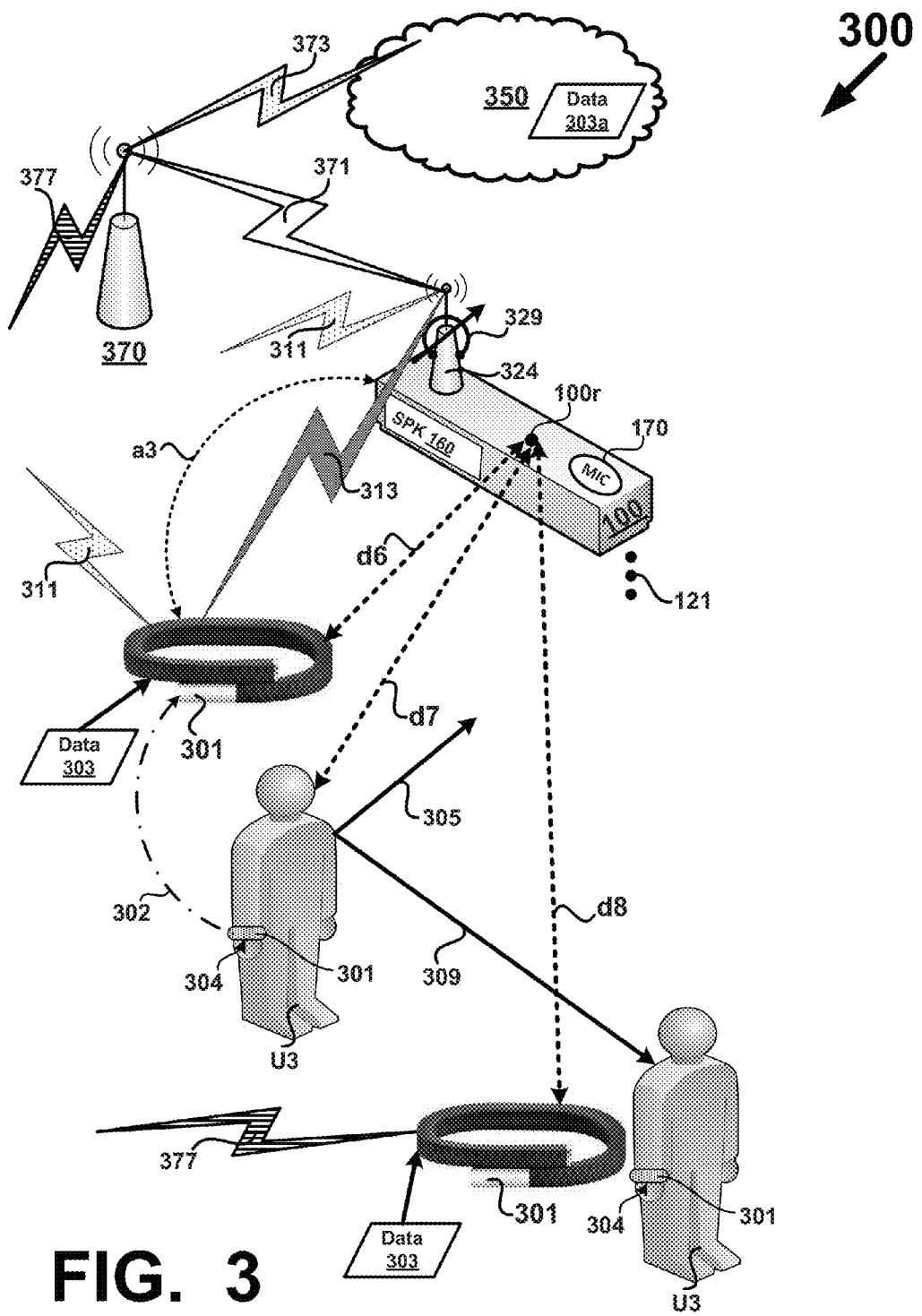
FIG. 3 depicts one example of a media device detecting proximity of a wireless user device, wirelessly linking with the user device, and taking an action using the wireless link according to an embodiment of the present application.

FIG. 3 depicts an example 300 of a media device detecting proximity of wireless user device, wirelessly linking with the user device, and optionally taking an action using the wireless link. In FIG. 3, a user U3 may be carrying a wireless device, such as a data capable strap band, wristband, wristwatch, or wireless activity monitoring and reporting device, for example, denoted for purposes of further explanation as wireless device 301. In the example, wireless device 301 is depicted as being worn about a wrist 304 of user U3, but wireless device 301 may be worn, attached, or otherwise connected with some other part of the body, clothing, apparel, headwear, footwear, etc. of user U3 and is not limited to the configuration depicted in FIG. 3.

The wireless device 301 is depicted in enlarged detail as denoted by dashed arrow 302 to aid in explaining the present application. User U3 moves 305 into proximity detection range of media device 100 such that at a distance d6 a RF signature of a wireless transmission 311 from wireless device 301 is detected by the RF system of media device 100. Here, antenna 324 is coupled with the RF system and optionally may be de-tunable 329 as will be described below. At least at the distance d6, a RF signal strength of the wireless transmissions 311 from wireless device 301 is sufficient (e.g., is of adequate signal strength) for the RF system to detect and analyze the RF signature of 311. The RF system analyzes (e.g., using hardware, software, an algorithm, a processor, controller, DSP, etc.) the signature of 311 and determines whether or not the RF signature conforms to a wireless protocol that is compatible with one or more of its plurality of RF transceivers. For purposes of explanation, it is assumed that the RF signature of transmission 311 is compatible with a wireless protocol of one of the RF systems transceivers. Media device 100 establishes a wireless communications link 313 with wireless device 301. Upon establishing the wireless communications link 313, the media device 100 may take some action a3. If action a3 is taken, then action a3 may be application and/or wireless user device specific. For example, action a3 may comprise maintaining the wireless communications link 313 for future wireless communication exchanges between media device 100 and wireless device 301. As another example, the establishing the wireless communications link 313 may comprise a BT radio link between media device 100 and wireless device 301, and the action a3 may comprise switching from BT radio to WiFi radio for wireless communication exchanges between media device 100 and wireless device 301, such that media device 100 and wireless device 301 communicate using their respective WiFi transceivers. WiFi communications may include the media device 100 and the wireless device 301 communicating with each other via a wireless network (e.g., wireless network 370) using a WiFi router or the like.

The following example is just one scenario of the type of action or actions that may be taken by the media device 100. For purposes of this example, wireless device 301 comprises a wearable device such as wireless activity monitoring and reporting device. While being worn by user U3, wireless device 301 has collected data (e.g., from one or more sensors carried by 301) and stored the data as denoted by 303. Data 303 may include biometric data gathered from sensing various systems or portions of user U3's body, the data 303 may have been entered by the user U3 using an application (e.g., an App) running on a smartphone, tablet, pad, computer, or the like, and data 303 may include information on calorie intake, calories burned (e.g., through activity), periods of rest, periods of sleep, body temperature, ambient temperature, motion data from exercise, running, walking, bicycling, swimming, etc. The data 303 may be quite extensive and the foregoing are non-limiting examples. Data 303 may include user defined information such as an alarm to wake the user U3 up at a preset time or within a preset range of times. The actual triggering of the alarm may comprise using some portion of the data 303 to determine how well rested the user U3 is and then using that portion of data 303 to wake up user U3 earlier or later, depending on how well user U3 slept. The alarm may be for any definable period such as time of day, day or days of the week, etc.

The alarm may be configured to cause the wireless device 301 to give a notification to user U3 to that announces the triggering of the alarm event. For example, while worn on the wrist of user U3, the wireless device 301 may be configured to vibrate to notify user U3 that the alarm has triggered and it is time to wake up. Alternatively, the wireless device 301 may emit sound or light to notify user U3. Here, after the wireless communications link 313 is established between media device 100 and wireless device 301, the action a3 taken by media device 100 may include transferring some or all of the data 303 stored in wireless device 301 (e.g., in a non-volatile memory such as Flash). On the other hand, the action a3 taken by media device 100 may include transmitting the data associated with the alarm from the wireless device 301 to the media device 100. Furthermore, after the data for the alarm is transmitted to the media device 100, the media device 100 may take over the processing (e.g., using its controller) and handling of the alarm. Media device 100 may use one of its systems (e.g., its A/V system) to notify user U3 that the alarm has triggered. For example, speaker 160 may be used to audibly notify user U3 that the alarm has triggered. Media device 100 may commandeer functions, data, actions, activities, communications, etc. that would otherwise be handled by wireless device 301.

As another example, absent the wireless link 313 between wireless device 301 and media device 100, the wireless device 301 may be configured to connect with a communications network using a wired connection (e.g., a USB port), a wireless connection (e.g., Bluetooth or WiFi), or both. Further, the wireless device 301 may use the wired/wireless connection to export at least a portion of the data 303. The data 303 may be uploaded to a web page, a web site, a social media site, etc. to be processed or viewed by the user U3 or other interested parties, such as friends in a social, a professional network, or a group of like-minded individuals (e.g., interested in health and exercise). However, while the wireless link 313 is active, the media device 100 may capture the data 303 or some portion of the data 303 and take some action a3 with regard to the data 303. As one example, media device 100 may be in wireless communication 371 with a wireless network 370 (e.g., WiFi, WiMAX, Cellular) and may harvest whatever data 303 is appropriate, and transmit 373 via the wireless network 370, that data 303a to the Internet, Cloud, NAS, Web page, web site, etc. generally denoted as resource 350. For example, data 303a may be transmitted to a web page of user U3 for display, analysis, processing, reporting progress against set goals, etc.

In FIG. 3, the wireless device 301 may move out of proximity of the media device 100 as denoted by arrow 309 and distance d8. After moving out of proximity, the wireless device 301 may regain control over whatever functions, processes, data, etc. that were commandeered by the media device 100 and/or the media device 100 may relinquish control of the commandeered function(s) back to the wireless device 301. Furthermore, after moving 309 out of range the wireless device 301 may use its native RF system to wirelessly communicate with another wireless resource, such as WiFi network 370, for example. For example, data 303 or a portion thereof may be transmitted to resource 350 using a wireless link 377 where it is stored as data 303a. The above description using the wireless device 301 as an example may be applied to other wireless user devices, such as smartphones, tablets, pads, laptop computers, cell phones, and the like, and is not limited to the wireless device 301 depicted in FIG. 3.

Other systems in media device 100 may detect proximity of user U3, such as proximity sensing system that uses one or more of acoustic, optical, vibration, or temperature sensors (e.g., a non-contact temperature sensor) to detect the presence of a user or other persons or objects within proximity of the media device 100. In FIG. 3, the proximity sensing system may be used to detect the presence of user U3 in isolation or in combination with the RF system detecting 311 the RF signature of the wireless device 301. For example, as the user U3 moves 305 into proximity of the media device 100, the proximity sensing system may detect presence of user U3 at a distance d7. Here, if the wireless device 301 is being worn by user U3, then d6 and d7 may be approximately equal. On the other hand, d6 and d7 may not be approximately equal to each other, if for example, user U3 has removed the wireless device 301 from his/her body (e.g., taken 301 off the wrist). At distance d7, the detection of user U3 by the proximity sensing system may activate one or more functions in media device 100 including but not limited to waking the media device 100 up from a standby state, causing the RF system to begin listening for RF signatures (e.g., 311), cause the A/V system to indicate a presence has been detected using any of sound, light, and vibration, just to name a few.

Figure 4:
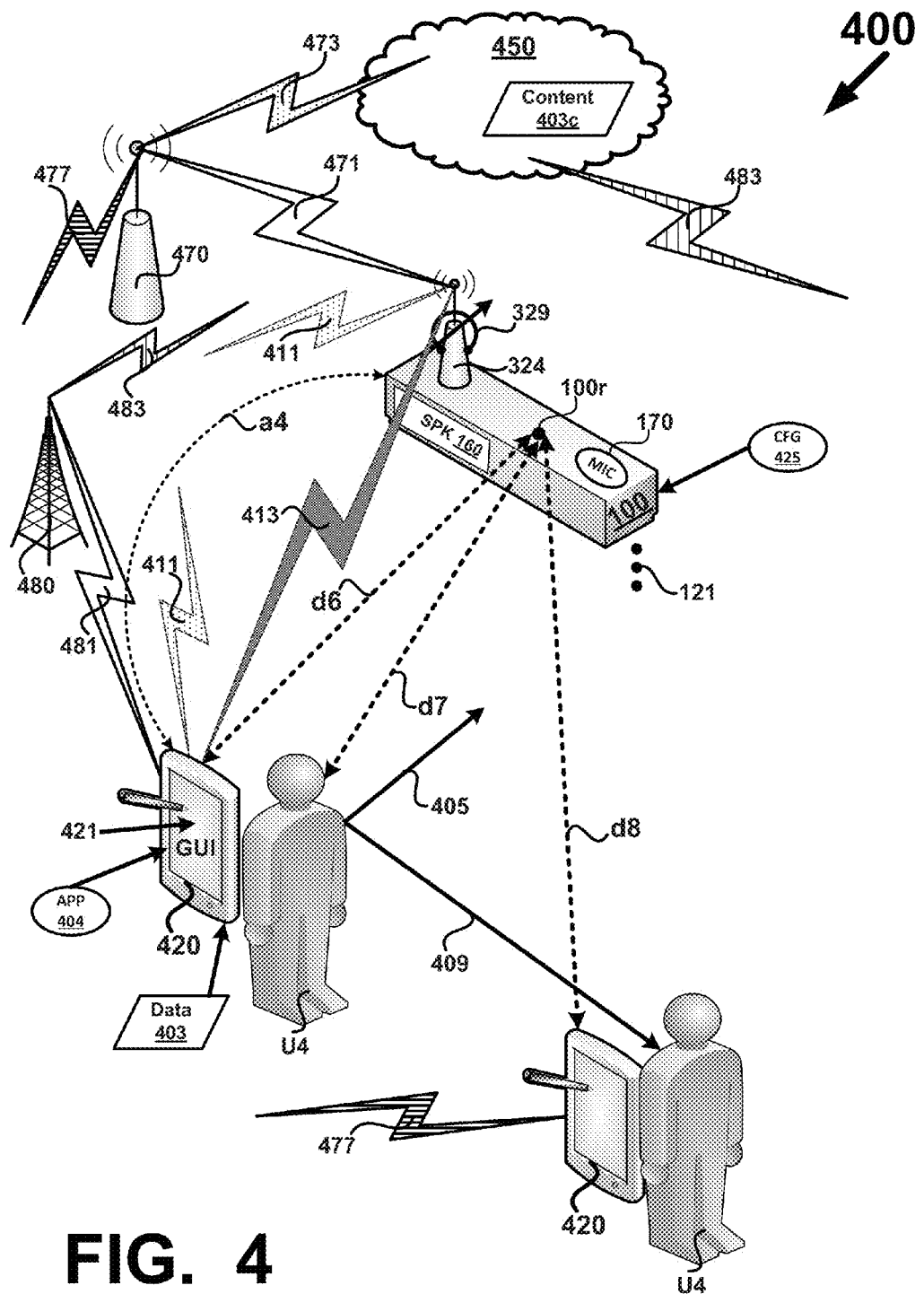
FIG. 4 depicts another example of a media device detecting proximity of a wireless user device, wirelessly linking with the user device, and taking an action using the wireless link according to an embodiment of the present application.

FIG. 4 depicts another example 400 of a media device detecting proximity of wireless user device, wirelessly linking with the user device, and optionally taking an action using the wireless link. Here, wireless user device 420 comprises a tablet or pad (e.g., an iPad or Galaxy Note) and the wireless user device 420, a user U4 or both, move 405 into proximity range (e.g., distance d6 and/or d7) of media device 100 and are detected by the proximity system, the RF system, or both as described above. RF signature 411 of wireless user device 420 is detected by the RF system and is found to be protocol compatible with one or more of its RF transceivers and a wireless communications link 413 is established between media device 100 and wireless user device 420. Action(s) a4 taken by media device 100 after establishing the wireless communications link 413 may be application and/or wireless user device specific.

As one example, prior to moving 405 into proximity of media device 100, the wireless user device 420 may be playing back content (e.g., music, video, images, etc.) and user U4 may be using a GUI on a display 421 to control the playback of the content. The content being played back may comprise data 403 that is resident (e.g., in its data storage system) on the wireless user device 420 and/or data 403 may comprise a playlist or gallery and the content may reside external to the wireless user device 420 such as in resource 450 (e.g., Cloud, Web page, NAS, or Internet) where the content 403c may comprise one or more files such as MP3, JPEG, MPEG4, FLAC, AIFF, WAV, etc., for example. Action a4 may comprise wirelessly transmitting a copy of the playlist in data 403 to the media device 100 and the media device 100 may commandeer the playback function and take over playback of the content using the systems of the media device 100, such as its A/V system. If the content resides on the wireless user device 420, action a4 may also comprise wirelessly transmitting a copy of some or all of the content to the media device 100 (e.g., to a data storage system of media device 100). Media device 100 may not have data storage capacity sufficient to store all of the content and may buffer the content in manageable portions. Alternatively, if the content resides in resource 450 (e.g., content 403c), then the data 403 may include a URL or some other form of address information that media device 100 may use to wirelessly access (471, 473) the content 403c from resource 450 (e.g., using wireless network 470). Resource 450 is just one example of an external location for content and the present application is not limited to the example depicted in FIG. 4. Prior to moving 405 into proximity of media device 100, the wireless user device 420 may have accessed content 403c using another wireless network, such as cellular network 450 or the like, and wireless communications links (481, 483) were used to access the content 403c. Action a4 may comprise media device 100 commandeering the handling of content 403c by using its own wireless resources such as its RF system and wireless network 470 to wirelessly access (471, 473) the content 403c from resource 450. User U4 may have been using an A/V system of the wireless user device 420 to experience the content 403c (e.g., using headphones, earphones) and action a4 may comprise commandeering the A/V function and causing playback to occur over speaker 160 or other components of the NV system of media device 100.

As another example, if prior to moving 405 into proximity of the media device 100, user U4 was having a VoIP conversation (e.g., Skype™) on wireless user device 420, action a4 may comprise commandeering the a VoIP conversation and using it's A/V system (e.g., MIC 170 and SPK 160) to handle the conversation. Media device 100 may include a display (e.g., a touch screen, LCD, OLED etc.) and any video portions of the VoIP conversation may be commandeered and presented on that display.

In some examples, the media device 100, the wireless user device 420, or both may include software and/or data fixed in a non-transitory computer readable medium an configured to allow the media device 100 and wireless user device 420 to communicate with each other, arbitrate access, command, and control between each other, and determine which wireless communication protocols to use. For purposes of explanation, the aforementioned software and/or data may comprise a configuration CFG 425 for media device 100 and an application APP 404 for wireless user device 420. Action a4 may comprise media device 100 acting to download APP 404 on wireless user device 420 after the wireless communications link 413 is established. Resource 450 may include a location where a file or the like for APP 404 is stored and media device 100 may access the file and use its wireless resources (e.g., 413, 471, 473) to obtain and install the APP 404 on wireless user device 420. In subsequent encounters between the wireless user device 420 and media device 100 (e.g., when they are in proximity of each other) the APP 404 need not be reinstalled and may serve to allow both devices to interact with each other. Furthermore, in subsequent encounters between the wireless user device 420 and media device 100 (e.g., when they are in proximity of each other) the APP 404 may have been updated or otherwise revised and action a4 may comprise installing an updated version of APP 404 on the wireless user device 420.

Figure 5:
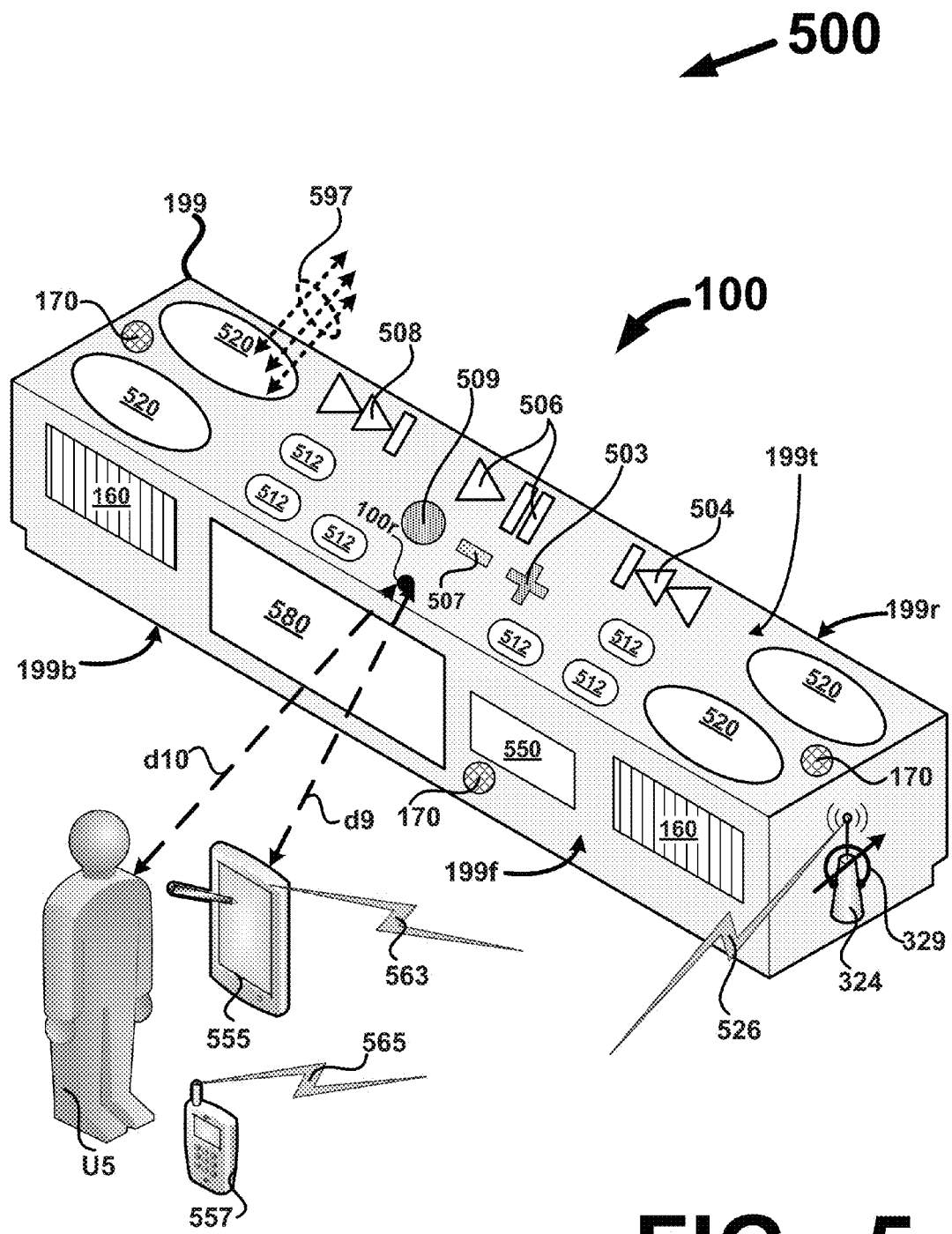
FIG. 5 depicts a profile view of one example of a media device including control elements and proximity detection islands according to embodiments of the present application.

Attention is now directed to FIG. 5 where a profile view depicts one example 500 of media device 100 that may include on a surface 199s (e.g., a top surface) of chassis 199, a plurality of optional control elements 503-512, and one or more proximity detection islands (four are depicted) denoted as 520. Some of the elements depicted in FIG. 5 are described in reference to FIG. 8 below. Media device 100 may include one or more speakers 160, one or more microphones 170, a display 580, a section 550 for other functions such as SEN 895, VID 890, or other, and antenna 324 which may be tunable 329. Each proximity detection island 520 may be configured to detect 597 proximity of one or more persons, such as user U5 as will be described in greater detail below. The layout and position of the elements on chassis 199 of media device 100 are examples only and actual layout and position of any elements will be application specific and/or a matter of design choice, including ergonomic and esthetic considerations. As will be described in greater detail below, detection of presence of user U5 may occur with or without the presence of one or more user devices 202, such as user devices 210 and 220 depicted in FIG. 5. Circuitry and/or software associated with operation of proximity detection islands 520 may work in conjunction with other systems in media device 100 to detect presence of one or more user devices 202, such as RF system 807 detecting RF signals 563 and/or 565 (e.g., via antenna 324) from user devices 555 and 557 or MIC's 170 detecting sound, for example. Detection of presence may be signaled by media device 100 in a variety of ways including but not limited to light (e.g., from 520 and/or 503-512), sound (e.g., from SPK 160), vibration (e.g., from SPK 160 or other), haptic feedback, tactile feedback, display of information (e.g., DISP 580), RF transmission (e.g., 126), just to name a few. SPK 160 and DISP 580 may be positioned on a front surface 199f of chassis 199. A bottom surface 199b of chassis 199 may be configured to rest on a surface such as a table, desk, cabinet, or the like. Other elements of media device 100 may be positioned on a rear surface 199r of chassis 199, such as another MIC 170.

Non-limiting examples of optional control elements 503-512 include a plurality of controls 512 (e.g., buttons, switches and/or touch surfaces) that may have functions that are fixed or change based on different scenarios as will be described below, controls 503 and 507 for volume up and volume down, control 509 for muting volume or BT paring, control 506 for initiating or pausing playback of content, control 504 for fast reversing playback or skipping backward one track, and control 508 for fast forwarding playback or skipping forward one track. Some are all of the control elements 504-512 may serve multiple rolls based on changing scenarios. For example, for playback of video content or for information displayed on display 580 (e.g., a touch screen), controls 503 and 507 may be used to increase "+" and decrease "−" brightness of display 580. Control 509 may be used to transfer or pick up a phone call or other content on a user device 555 and/or 557, for example. Proximity detection islands 520 and/or control elements 503-512 may be backlit (e.g., using LED's or the like) for night or low-light visibility.

Figure 6:
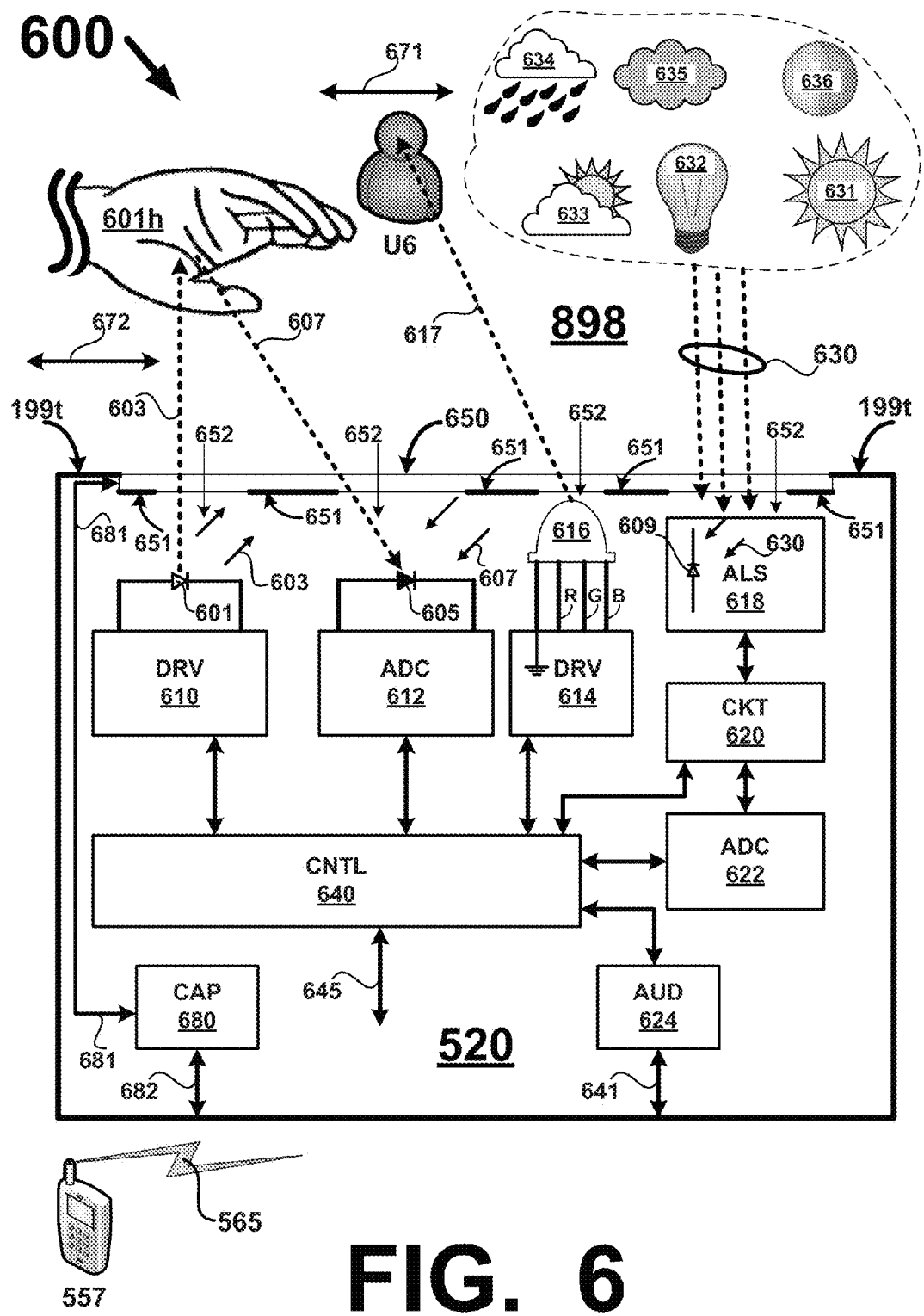
FIG. 6 depicts a block diagram of one example of a proximity detection island according to embodiments of the present application.

Moving on to FIG. 6, a block diagram 600 depicts one example of a proximity detection island 520. Proximity detection island 520 may be implemented using a variety of technologies and circuit topologies and the example depicted in FIG. 6 is just one such non-limiting example and the present application is not limited to the arrangement of elements depicted in FIG. 6. Some of the elements depicted in FIG. 5 are described in reference to FIG. 8 below. One or more proximity detection islands 520 may be positioned on, connected with, carried by or otherwise mounted on media device 100. For example, proximity detection island 520 may be mounted on a top surface 199t of chassis 199. A structure 650 made from an optically transmissive material such as glass, plastic, a film, an optically transparent or translucent material, or the like. Structure 650 may be made from a material that allows light 603, 607, 617, and 630 to pass through it in both directions, that is, bi-directionally. Structure 650 may include apertures 652 defined by regions 651 (e.g., an opaque or optically reflective/absorptive material) used for providing optical access (e.g., via apertures 652) to an environment ENV 898 external to the media device 100 for components of the proximity detection island 520. Structure 650 may be configured to mount flush with top surface 199t, for example. In some examples, structure 650 may not include regions 651.

Proximity detection island 520 may include at least one LED 601 (e.g., an infrared LED-IR LED) electrically coupled with driver circuitry 610 and configured to emit IR radiation 603, at least one IR optical detector 605 (e.g., a PIN diode) electrically coupled with an analog-to-digital converter ADC 612 and configured to generate a signal in response to IR radiation 607 incident on detector 605, and at least one indicator light 616 electrically coupled with driver circuitry 614 and configured to generate colored light 617. As depicted, indicator light 616 comprises a RGB LED configured to emit light 617 in a gambit of colors indicative of status as will be described below. Here, RGB LED 616 may include four terminals, one of which coupled with circuit ground, a red "R" terminal, a green "G" terminal, and a blue "B" terminal, all of which are electrically connected with appropriate circuitry in driver 614 and with die within RGB LED 616 to effectuate generation of various colors of light in response to signals from driver 614. For example, RGB LED 616 may include semiconductor die for LED's that generate red, green, and blue light that are electrically coupled with ground and the R, G, and B terminals, respectively. One skilled in the art will appreciate that element 616 may be replaced by discrete LED's (e.g., separate red, green, white, and blue LED's) or a single non-RGB LED or other light emitting device may be used for 616. The various colors may be associated with different users who approach and are detected in proximity of the media device and/or different user devices that are detected by the media device. Therefore, if there are four users/and our user devices detected, then: the color blue may be associated with user #1; yellow with user #2; green with user #3; and red with user #4. Some users and or user devices may be indicated using alternating colors of light such as switching/flashing between red and green, blue and yellow, blue and green, etc. In other examples other types of LED's may be combined with RGB LED 616, such as a white LED, for example, to increase the number of color combinations possible.

Optionally, proximity detection island 520 may include at least one light sensor for sensing ambient light conditions in the ENV 898, such as ambient light sensor ALS 618. ALS 618 may be electrically coupled with circuitry CKT 620 configured to process signals from ALS 618, such as optical sensor 609 (e.g., a PIN diode) in response to ambient light 630 incident on optical sensor 609. Signals from CKT 620 may be further processed by ADC 622. The various drivers, circuitry, and ADC's of proximity detection island 520 may be electrically coupled with a controller (e.g., a pC, a pP, an ASIC, or controller 801 of FIG. 8) that is electrically coupled with a bus 645 (e.g., bus 810 of FIG. 8) that communicates signals between proximity detection island 520 and other systems of media device 100. Proximity detection island 520 may include auditory system AUD 624 configured to generate sound or produce vibrations in response to presence detection or other signals. AUD 624 may be mechanically coupled 641 with chassis 199 to cause chassis 199 to vibrate or make sound in response to presence detection or other signals. In some examples AUD 624 may use SPK 160 to generate sound or vibration. In other examples AUD 624 may use a vibration motor, such as the type used in smartphones to cause vibration when a phone call or notification is received. In yet another example, AUD 624 may use a piezoelectric film that deforms in response to an AC or DC signal applied to the film, the deformation generating sound and/or vibration. In yet other examples, AUD 624 may be connected with or mechanically coupled with one or more of the control elements and/or one or more of the proximity detection islands 520 depicted in FIG. 5 to provide haptic and/or tactile feedback. Upon detecting and acknowledging an approach by a user and/or user device, media may generate sound (e.g., from SPK 160) in a rich variety of tones and volume levels to convey information and/or media device status to the user. For example, a tone and volume level may be used to indicate the power status of the media device 100, such as available charge in BAT 835 of power system 811. The volume of the tone may be louder when BAT 835 is fully charged and lower for reduced levels of charge in BAT 835. Other tones and volume levels may be used to indicate the media device 100 is ready to receive input from the user or user device, the media device 100 is in wireless communications with a WiFi router or network, cellular service, broadband service, ad hoc WiFi network, other BT enabled devices, for example.

Proximity detection island 520 may be configured to detect presence of a user U6 (or other person) that enters 671 an environment 898 the media device 100 is positioned in. Here, entry 671 by user U6 may include a hand 601h or other portion of the user U6 body passing within optical detection range of proximity detection island 520, such as hand 601h passing over 672 the proximity detection island 520, for example. IR radiation 603 from IRLED 603 exiting through portal 652 reflects off hand 601h and the reflected IR radiation 607 enters portal 652 and is incident on IR detector 605 causing a signal to be generated by ADC 612, the signal being indicative of presence being detected. RGB LED 616 may be used to generate one or more colors of light that indicate to user U6 that the user's presence has been detected and the media device is ready to take some action based on that detection. The action taken will be application specific and may depend on actions the user U6 programmed into CFG 825 using APP 425, for example. The action taken and/or the colors emitted by RGB LED 616 may depend on the presence and/or detection of a user device 557 in conjunction with or instead of detection of presence of user U6 (e.g., RF 565 from device 557 by RF 807).

As described above, proximity detection island 520 may optionally include ambient light sensor ALS 618 configured to detect ambient light 630 present in ENV 898 such as a variety of ambient light sources including but not limited to natural light sources such as sunny ambient 631, partially cloudy ambient 633, inclement weather ambient 634, cloudy ambient 635, and night ambient 636, and artificial light ambient 632 (e.g., electronic light sources). ALS 618 may work in conjunction with IRLED 610 and/or IR detector 605 to compensate for or reduce errors in presence detection that are impacted by ambient light 630, such as IR background noise caused by IR radiation from 632 or 631, for example. IR background noise may reduce a signal-to-noise ratio of IR detector 605 and cause false presence detection signals to be generated by ADC 612.

ALS 618 may be used to detect low ambient light 630 condition such as moonlight from 636 or a darkened room (e.g., light 632 is off), and generate a signal consistent with the low ambient light 630 condition that is used to control operation of proximity detection island 520 and/or other systems in media device 100. As one example, if user approaches 671 proximity detection island 520 in low light or no light conditions as signaled by ALS 618, RGB LED 616 may emit light 617 at a reduced intensity to prevent the user U6 from being startled or blinded by the light 617. Further, under low light or no light conditions AUD 624 may be reduced in volume or vibration magnitude or may be muted. Additionally, audible notifications (e.g., speech or music from SPK 160) from media device 100 may be reduced in volume or muted under low light or no light conditions (see FIG. 9).

Structure 650 may be electrically coupled 681 with capacitive touch circuitry 680 such that structure 650 is operative as a capacitive touch switch that generates a signal when a user (e.g., hand 601*h*) touches a portion of structure 650. Capacitive touch circuitry 680 may communicate 682 a signal to other systems in media device 100 (e.g., I/O 105) that process the signal to determine that the structure 650 has been touched and initiate an action based on the signal. A user's touch of structure 650 may trigger driver 614 to activate RGB LED 616 to emit light 617 to acknowledge the touch has been received and processed by media device 100.

Figure 7:
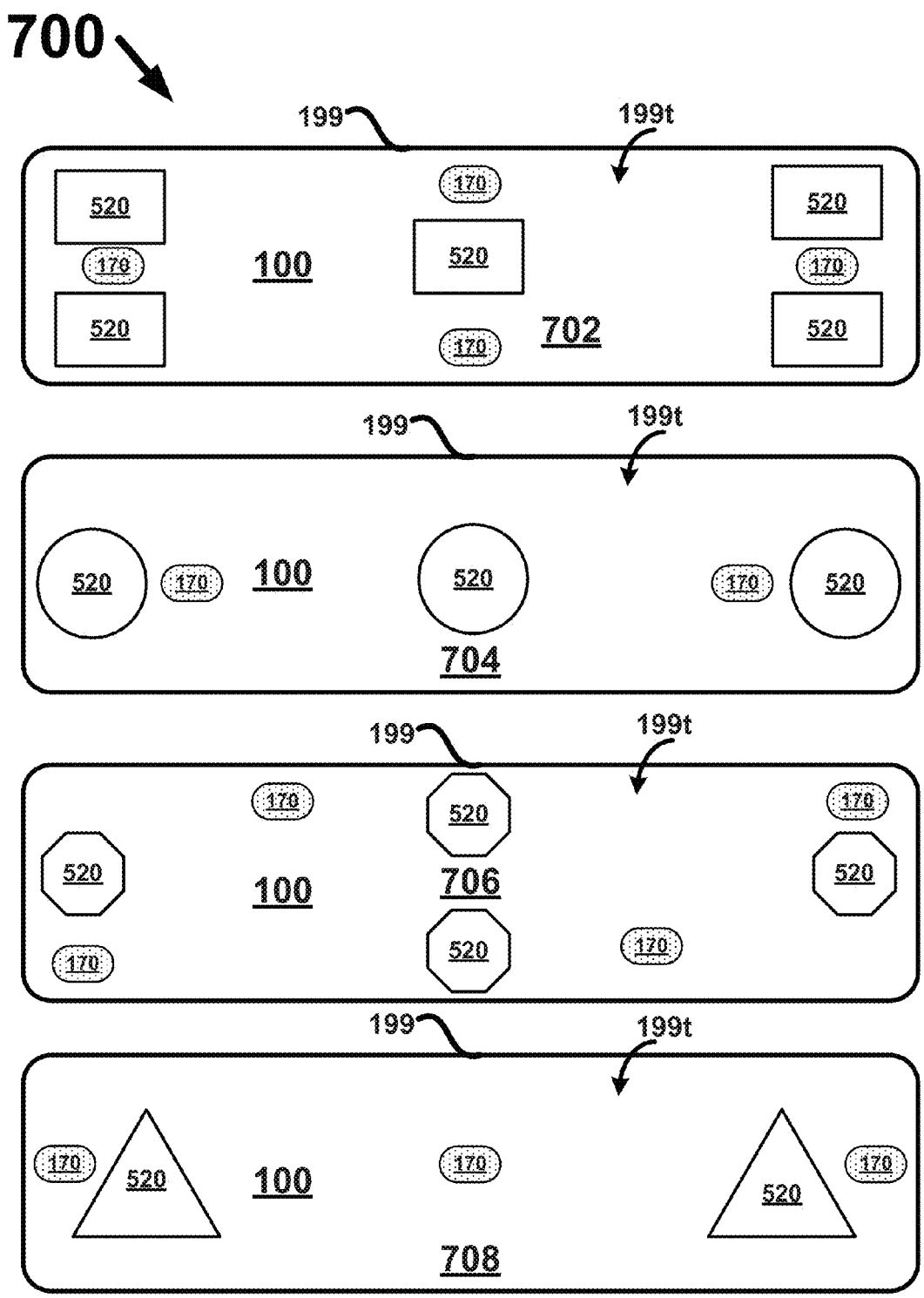
FIG. 7 depicts a top plan view of different examples of proximity detection island configurations according to embodiments of the present application.

Reference is now made to FIG. 7, where top plan views of different examples of proximity detection island 520 configurations are depicted. Although the various example configurations and shapes are depicted as positioned on top surface 199*t* of chassis 199, the present application is not so limited and proximity detection islands 520 may be positioned on other surfaces/portions of media device 100 and may have shapes different than that depicted. Furthermore, media device 100 may include more or fewer proximity detection islands 520 than depicted in FIG. 7 and the proximity detection islands 520 need not be symmetrically positioned relative to one another. Actual shapes of the proximity detection islands 520 may be application specific and may be based on esthetic considerations. Configuration 702 depicts five rectangular shaped proximity detection islands 520 positioned on top surface 199*t* with four positioned proximate to four corners of the top surface 199*t* and one proximately centered on top surface 199*t*. Configuration 704 depicts three circle shaped proximity detection islands 520 proximately positioned at the left, right, and center of top surface 199*t*. Configuration 706 depicts four hexagon shaped proximity detection islands 520 proximately positioned at the left, right, and two at the center of top surface 199*t*. Finally, configuration 708 depicts two triangle shaped proximity detection islands 520 proximately positioned at the left, right of top surface 199*t*. In some examples there may be a single proximity detection island 520. Proximity detection islands 520 may be configured to operate independently of one another, or in cooperation with one another.

Other elements such as one or more of MIC 170 may be included on surface 199*t* and positioned in various configurations. One or more of MIC 170 may be used in conjunction with one or more of the Proximity detection islands 520 to detect presence and/or proximity of users, for example. Each MIC 170 may include a directional pattern configured to allow the MIC 170 to detect sound from a particular direction or vector. For example, each MIC 170 may have a polar pattern suitable for the intended application including but not limited to omni-directional, directional, bi-directional, uni-directional, bi-polar, uni-polar, any variety of cardioid pattern, and shotgun, and those polar patterns may be the same or may differ among the MIC's 170. The MIC's 170 need not be positioned on a top surface of chassis 199 and other portions of chassis 199 such as the front, back, sides, etc. may have one or more of the MIC's 170 positioned on them.

The polar patterns of one or more of the MIC's 170 may overlap one another. A signal from each MIC 170 may be combined and/or processed (e.g., with a DSP and/or algorithms) with signals from other MIC's 170 to detect presence, location, proximity, motion, direction of motion of an object, etc. Additionally, signals from one or more of the MIC's 170 may be combined with signals from one or more of the proximity detection islands 520 and/or RF system 807 and its de-tunable antenna (824, 829) to detect presence, location, proximity, motion, direction of motion of an object, etc. MIC's 170 may be configured to detect sound in any frequency range, such as ultrasonic and may be used in conjunction with one or more SPK's 160 to detect presence, location, proximity, motion, direction of motion of an object, etc. As one example, one or more SPK's 160 may emit sound in at an ultrasonic frequency and one or more of the MIC's 170 may detect reflected sound in the ultrasonic frequency band. Signals from the one or more of the MIC's 170 may be analyzed (e.g., using a processor such as a DSP and/or algorithms) to determine if the signals from the reflected sound are indicative of presence, location, proximity, motion, direction of motion of an object, etc. Algorithms and/or processing hardware for echolocation, Doppler Effect, sonar, or the like may be used to by media device 100 to acoustically determine proximity, motion, location, and position of objects.

Figure 7A:
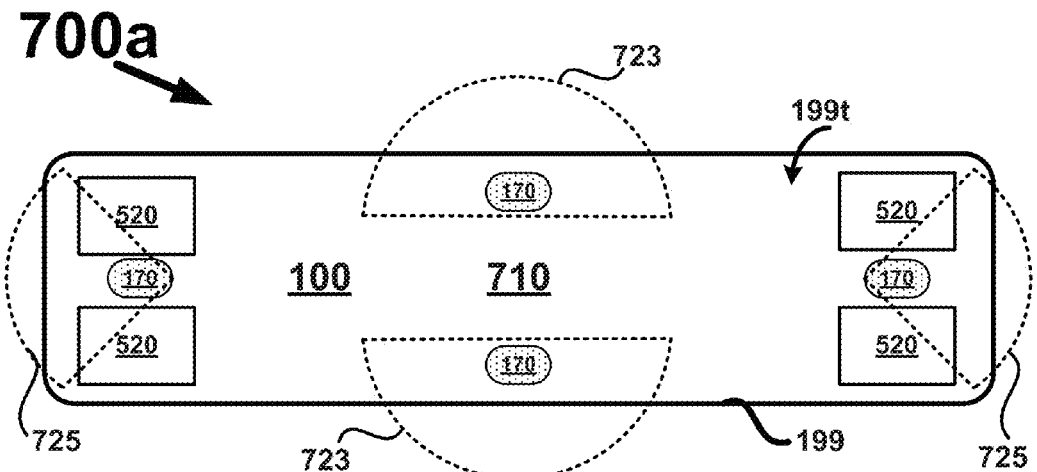
FIGS. 7A-7B depict examples of detection patterns for microphones and proximity detection islands respectively according to an embodiment of the present application.
Figure 7B:
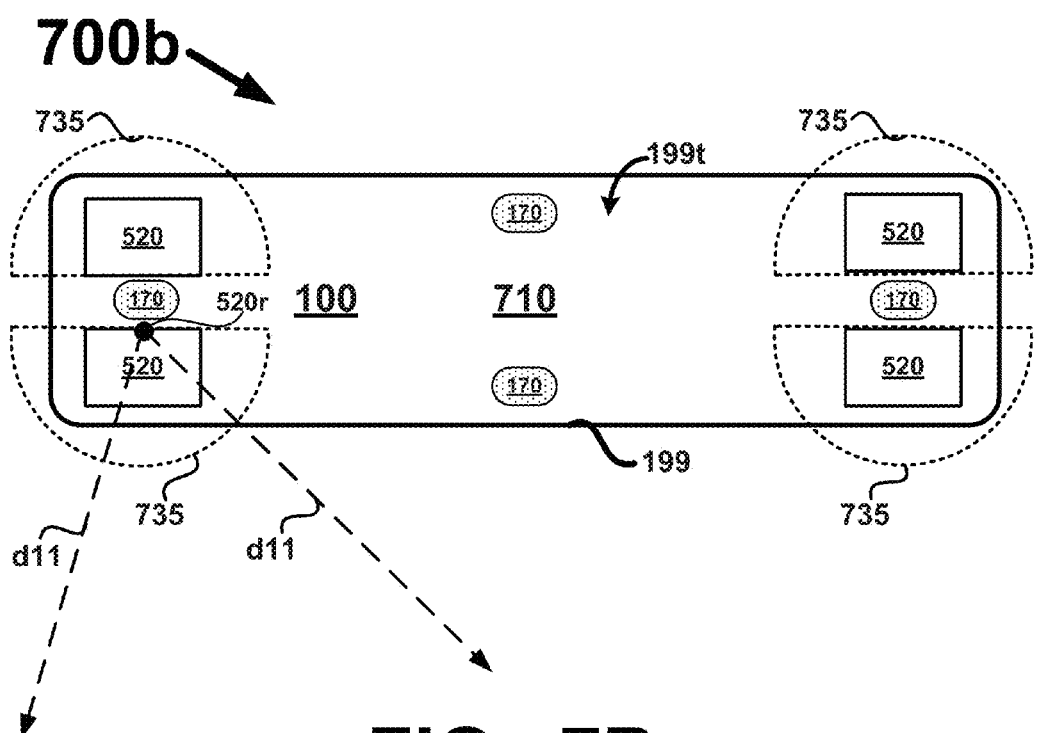

FIGS. 7A-7B depict examples 700*a* and 700*b* of detection patterns for microphones and proximity detection islands respectively. In FIG. 7A media device 100 configuration 710 includes four (4) MIC's 170 and the polar pattern differs among the four microphones such that two of the MIC's 170 have a polar pattern 723 and the other two MIC's 170 have a polar pattern 725. The number and placement of the MIC's 170 and their respective polar patterns are non-limiting examples and other configurations may be used. Here, MIC's 170 having polar pattern 725 (e.g., approximately 90 degrees) may be configured to detect sound in a direction approximately from the far ends of media device 100; whereas, MIC's 170 having polar pattern 723 (e.g., approximately 180 degrees) may be configured to detect sound in a direction approximately the front, sides, and rear of media device 100. There may be overlap between the polar patterns of the MIC's 170.

In FIG. 7B, four (4) proximity detection islands 520 all have an approximately identical detection patter 735 that is approximately 180 degrees relative to an arbitrary reference point 520*r*. Each proximity detection island 520 may be configured to detect proximity out to an approximate distance of d11 from reference point 520*r* (e.g., to a radius of d11). The number and placement of the proximity detection islands 520 and their respective detection patterns are non-limiting examples and other configurations may be used. There may be overlap between the detection patterns of the proximity detection islands 520. In some examples, the polar patterns of MIC's 170 and the detection patterns of proximity detection islands 520 may be selected to complement one another, overlap one another, be exclusive of one another, or some combination of the foregoing.

Figure 8:
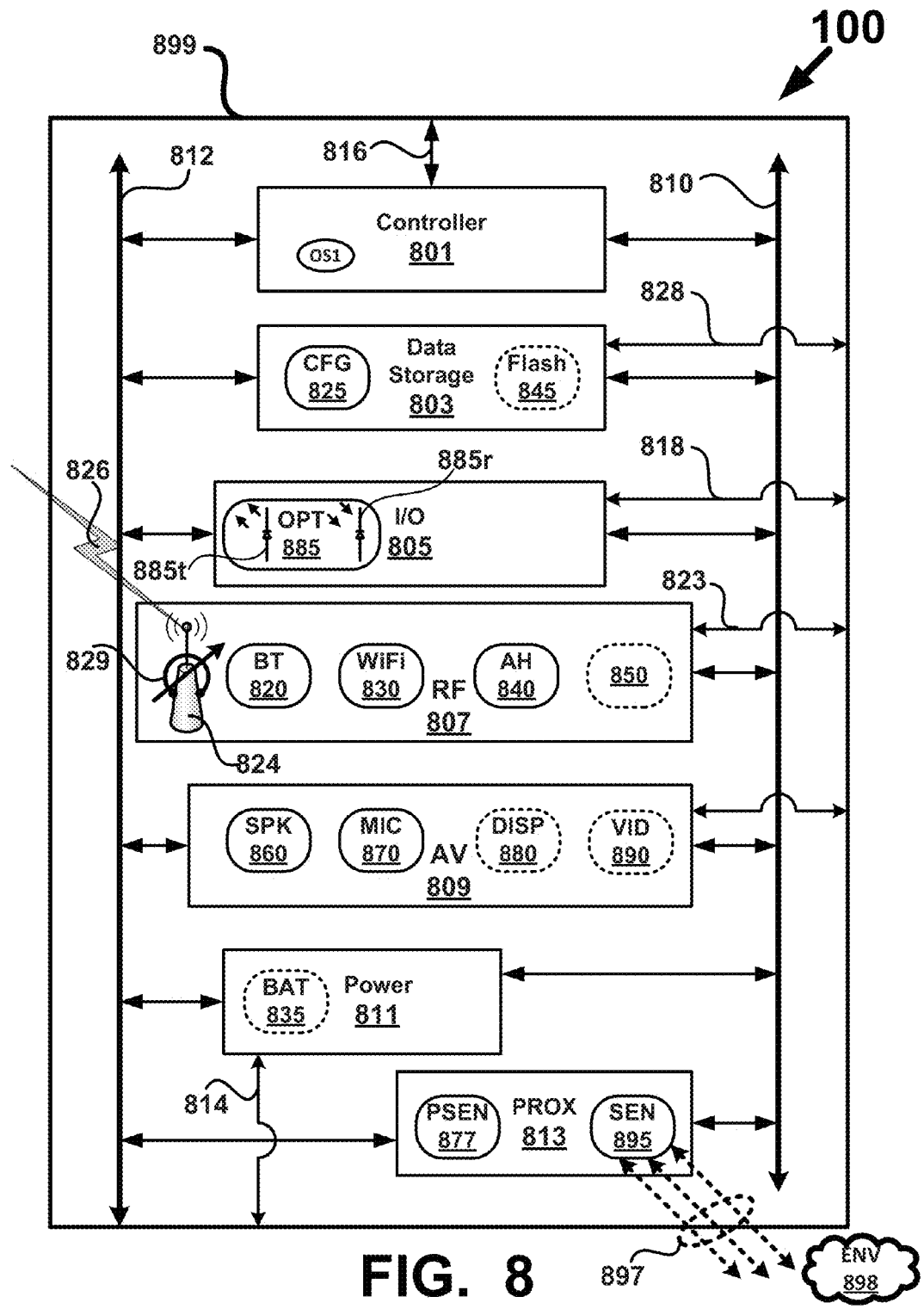
FIG. 8 depicts a block diagram of one example of a media device according to an embodiment of the present application.

FIG. 8 depicts a block diagram of one example of a media device 100. Media device 100 may have systems including but not limited to a controller 801, a data storage (DS) system 803, a input/output (I/O) system 805, a radio frequency (RF) system 807, an audio/video (NV) system 809, a power system 811, and a proximity sensing (PROX) system 813. A bus 810 enables electrical communication between the controller 801, DS system 803, I/O system 805, RF system 807, AV system 809, power system 811, and PROX system 813. Power bus 812 supplies electrical power from power system 811 to the controller 801, DS system 803, I/O system 805, RF system 807, AV system 809, and PROX system 813.

Power system 811 may include a power source internal to the media device 100 such as a battery (e.g., AAA or AA batteries) or a rechargeable battery (e.g., such as a lithium ion or nickel metal hydride type battery, etc.) denoted as BAT 835. Power system 811 may be electrically coupled with a port 814 for connecting an external power source (not shown) such as a power supply that connects with an external AC or DC power source. Examples include but are not limited to a wall wart type of power supply that converts AC power to DC power or AC power to AC power at a different voltage level. In other examples, port 814 may be a connector (e.g., an IEC connector) for a power cord that plugs into an AC outlet or other type of connecter, such as a universal serial bus (USB) connector. Power system 811 provides DC power for the various systems of media device 100. Power system 811 may convert AC or DC power into a form usable by the various systems of media device 100. Power system 811 may provide the same or different voltages to the various systems of media device 100. In applications where a rechargeable battery is used for BAT 835, the external power source may be used to power the power system 811, recharge BAT 835, or both. Further, power system 811 on its own or under control or controller 801 may be configured for power management to reduce power consumption of media device 100, by for example, reducing or disconnecting power from one or more of the systems in media device 100 when those systems are not in use or are placed in a standby or idle mode. Power system 811 may also be configured to monitor power usage of the various systems in media device 100 and to report that usage to other systems in media device 100 and/or to other devices (e.g., including other media devices 100 and user devices 120) using one or more of the I/O system 805, RF system 807, and AV system 809, for example. Operation and control of the various functions of power system 811 may be externally controlled by other devices (e.g., including other media devices 100).

Controller 801 controls operation of media device 100 and may include a non-transitory computer readable medium, such as executable program code to enable control and operation of the various systems of media device 100. For example, operating system OS1 may be stored in Flash memory 845 of DS 803 and be used (e.g., loaded or booted up) by controller 801 to control operation of the media device 100. DS 803 may be used to store executable code used by controller 801 in one or more data storage mediums such as ROM, RAM, SRAM, RAM, SSD, Flash, etc., for example. Controller 801 may include but is not limited to one or more of a microprocessor (pP), a microcontroller (pP), a digital signal processor (DSP), a baseband processor, an application specific integrated circuit (ASIC), a field programmable gate array (FPGA), just to name a few. Processors used for controller 801 may include a single core or multiple cores (e.g., dual core, quad core, etc.). Port 816 may be used to electrically couple controller 801 to an external device (not shown).

DS system 803 may include but is not limited to non-volatile memory (e.g., Flash memory), SRAM, DRAM, ROM, SSD, just to name a few. In that the media device 100 in some applications is designed to be compact, portable, or to have a small size footprint, memory in DS 803 will typically be solid state memory (e.g., no moving or rotating components); however, in some application a hard disk drive (HDD) or hybrid HDD may be used for all or some of the memory in DS 803. In some examples, DS 803 may be electrically coupled with a port 828 for connecting an external memory source (e.g., USB Flash drive, SD, SDHC, SDXC, microSD, Memory Stick, CF, SSD, etc.). Port 828 may be a USB or mini USB port for a Flash drive or a card slot for a Flash memory card. In some examples as will be explained in greater detail below, DS 803 includes data storage for configuration data, denoted as CFG 825 (e.g., C-Data), used by controller 801 to control operation of media device 100 and its various systems. DS 803 may include memory designated for use by other systems in media device 100 (e.g., MAC addresses for WiFi 830, network passwords, data for settings and parameters for A/V 809, and other data for operation and/or control of media device 100, etc.). DS 803 may also store data used as an operating system (OS) for controller 801 (e.g., OS1). If controller 801 includes a DSP, then DS 803 may store data, algorithms, program code, an OS, etc. for use by the DSP, for example. In some examples, one or more systems in media device 100 may include their own data storage systems. CFG (425, 825) may be used by media device 100 to allow for interoperability between the media device 100 and other wireless user devices having operating systems (OS) that are different than OS1 and having different system architectures. For example, wireless user devices 420, 555, and 557 (see FIGS. 4-5) may have OS's that are different than OS1 of media device 100 and may have different system architectures. CFG (425, 825) and/or applications (e.g., APP 404) may be used to facilitate wireless communication, control, command, interoperability, and other functions necessary to allow the media device to communicate with and work with wireless user devices it detects and wirelessly links with.

I/O system 805 may be used to control input and output operations between the various systems of media device 100 via bus 810 and between systems external to media device 100 via port 818. Port 818 may be a connector (e.g., USB, HDMI, Ethernet, fiber optic, Toslink, Firewire, IEEE 1394, or other) or a hard wired (e.g., captive) connection that facilitates coupling I/O system 805 with external systems. In some examples port 818 may include one or more switches, buttons, or the like, used to control functions of the media device 100 such as a power switch, a standby power mode switch, a button for wireless pairing, an audio muting button, an audio volume control, an audio mute button, a button for connecting/disconnecting from a WiFi network, an infrared (IR) transceiver, just to name a few. I/O system 805 may also control indicator lights, audible signals, or the like (not shown) that give status information about the media device 100, such as a light to indicate the media device 100 is powered up, a light to indicate the media device 100 is in wireless communication (e.g., WiFi, Bluetooth®, WiMAX, cellular, etc.), a light to indicate the media device 100 is Bluetooth® paired, in Bluetooth® pairing mode, Bluetooth® communication is enabled, a light to indicate the audio and/or microphone is muted, just to name a few. Audible signals may be generated by the I/O system 805 or via the AV system 807 to indicate status, etc. of the media device 100. Audible signals may be used to announce Bluetooth® status, powering up or down the media device 100, muting the audio or microphone, an incoming phone call, a new message such as a text, email, or SMS, just to name a few. In some examples, I/O system 805 may use optical technology to wirelessly communicate with other media devices 100 or other devices. Examples include but are not limited to infrared (IR) transmitters, receivers, transceivers, an IR LED, and an IR detector, just to name a few. I/O system 805 may include an optical transceiver OPT 885 that includes an optical transmitter 885$t$ (e.g., an IR LED) and an optical receiver 885$r$ (e.g., a photo diode). OPT 885 may include the circuitry necessary to drive the optical transmitter 885$t$ with encoded signals and to receive and decode signals received by the optical receiver 885$r$. Bus 810 may be used to communicate signals to and from OPT 885. OPT 885 may be used to transmit and receive IR commands consistent with those used by infrared remote controls used to control AV equipment, televisions, computers, and other types of systems and consumer electronics devices. The IR commands may be used to control and configure the media device 100, or the media device 100 may use the IR commands to configure/re-configure and control other media devices or other user devices, for example.

RF system 807 includes at least one RF antenna 824 that is electrically coupled with a plurality of radios (e.g., RF transceivers) including but not limited to a Bluetooth® (BT) transceiver 820, a WiFi transceiver 830 (e.g., for wireless communications over a WiFi and/or WiMAX network), and a proprietary Ad Hoc (AH) transceiver 840 pre-configured (e.g., at the factory) to wirelessly communicate with a proprietary Ad Hoc wireless network (AH-WiFi) (not shown). AH 840 and AH-WiFi are configured to allow wireless communications between similarly configured media devices (e.g., an ecosystem comprised of a plurality of similarly configured media devices) as will be explained in greater detail below. RF system 807 may include more or fewer radios than depicted in FIG. 8 and the number and type of radios will be application dependent. Furthermore, radios in RF system 807 need not be transceivers, RF system 807 may include radios that transmit only or receive only, for example. Optionally, RF system 807 may include a radio 850 configured for RF communications using a proprietary format, frequency band, or other existent now or to be implemented in the future. Radio 850 may be used for cellular communications (e.g., 3G, 4G, or other), for example. Antenna 824 may be configured to be a de-tunable antenna such that it may be de-tuned 829 over a wide range of RF frequencies including but not limited to licensed bands, unlicensed bands, WiFi, WiMAX, cellular bands, Bluetooth®, from about 2.0 GHz to about 6.0 GHz range, and broadband, just to name a few. As will be discussed below, PROX system 813 may use the de-tuning 829 capabilities of antenna 824 to sense proximity of the user, other people, the relative locations of other media devices 100, just to name a few. Radio 850 (e.g., a transceiver) or other transceiver in RF 807, may be used in conjunction with the de-tuning capabilities of antenna 824 to sense proximity, to detect and or spatially locate other RF sources such as those from other media devices 100, devices of a user, just to name a few. RF system 807 may include a port 823 configured to connect the RF system 807 with an external component or system, such as an external RF antenna, for example. The transceivers depicted in FIG. 8 are non-limiting examples of the type of transceivers that may be included in RF system 807. RF system 807 may include a first transceiver configured to wirelessly communicate using a first protocol, a second transceiver configured to wirelessly communicate using a second protocol, a third transceiver configured to wirelessly communicate using a third protocol, and so on. One of the transceivers in RF system 807 may be configured for short range RF communications, such as within a range from about 1 meter to about 15 meters, or less, for example. Another one of the transceivers in RF system 807 may be configured for long range RF communications, such any range up to about 50 meters or more, for example. Short range RF may include Bluetooth®; whereas, long range RF may include WiFi, WiMAX, cellular, and Ad Hoc wireless, for example.

AV system 809 includes at least one audio transducer, such as a loud speaker 860, a microphone 870, or both. AV system 809 further includes circuitry such as amplifiers, preamplifiers, or the like as necessary to drive or process signals to/from the audio transducers. Optionally, AV system 809 may include a display (DISP) 880, video device (VID) 890 (e.g., an image capture device or a web CAM, etc.), or both. DISP 880 may be a display and/or touch screen (e.g., a LCD, OLED, or flat panel display) for displaying video media, information relating to operation of media device 100, content available to or operated on by the media device 100, playlists for media, date and/or time of day, alphanumeric text and characters, caller ID, file/directory information, a GUI, just to name a few. A port 822 may be used to electrically couple AV system 809 with an external device and/or external signals. Port 822 may be a USB, HDMI, Firewire/IEEE-1394, 3.5 mm audio jack, or other. For example, port 822 may be a 3.5 mm audio jack for connecting an external speaker, headphones, earphones, etc. for listening to audio content being processed by media device 100. As another example, port 822 may be a 3.5 mm audio jack for connecting an external microphone or the audio output from an external device. In some examples, SPK 860 may include but is not limited to one or more active or passive audio transducers such as woofers, concentric drivers, tweeters, super tweeters, midrange drivers, sub-woofers, passive radiators, just to name a few. MIC 870 may include one or more microphones and the one or more microphones may have any polar pattern suitable for the intended application including but not limited to omni-directional, directional, bi-directional, uni-directional, bi-polar, uni-polar, any variety of cardioid pattern, and shotgun, for example. MIC 870 may be configured for mono, stereo, or other. MIC 870 may be configured to be responsive (e.g., generate an electrical signal in response to sound) to any frequency range including but not limited to ultrasonic, infrasonic, from about 20 Hz to about 20 kHz, and any range within or outside of human hearing. In some applications, the audio transducer of AV system 809 may serve dual roles as both a speaker and a microphone.

Circuitry in AV system 809 may include but is not limited to a digital-to-analog converter (DAC) and algorithms for decoding and playback of media files such as MP3, FLAC, AIFF, ALAC, WAV, MPEG, QuickTime, AVI, compressed media files, uncompressed media files, and lossless media files, just to name a few, for example. A DAC may be used by AV system 809 to decode wireless data from a user device or from any of the radios in RF system 807. AV system 809 may also include an analog-to-digital converter (ADC) for converting analog signals, from MIC 870 for example, into digital signals for processing by one or more system in media device 100.

Media device 100 may be used for a variety of applications including but not limited to wirelessly communicating with other wireless devices, other media devices 100, wireless networks, and the like for playback of media (e.g., streaming content), such as audio, for example. The actual source for the media need not be located on a user's device (e.g., smart phone, MP3 player, iPod, iPhone, iPad, Android, laptop, PC, etc.). For example, media files to be played back on media device 100 may be located on the Internet, a web site, or in the cloud, and media device 100 may access (e.g., over a WiFi network via WiFi 830) the files, process data in the files, and initiate playback of the media files. Media device 100 may access or store in its memory a playlist or favorites list and playback content listed in those lists. In some applications, media device 100 will store content (e.g., files) to be played back on the media device 100 or on another media device 100.

Media device 100 may include a housing, a chassis, an enclosure or the like, denoted in FIG. 8 as 899. The actual shape, configuration, dimensions, materials, features, design, ornamentation, aesthetics, and the like of housing 899 will be application dependent and a matter of design choice. Therefore, housing 899 need not have the rectangular form depicted in FIG. 8 or the shape, configuration etc., depicted in the Drawings of the present application. Nothing precludes housing 899 from comprising one or more structural elements, that is, the housing 899 may be comprised of several housings that form media device 100. Housing 899 may be configured to be worn, mounted, or otherwise connected to or carried by a human being. For example, housing 899 may be configured as a wristband, an earpiece, a headband, a headphone, a headset, an earphone, a hand held device, a portable device, a desktop device, just to name a few.

In other examples, housing 899 may be configured as speaker, a subwoofer, a conference call speaker, an intercom, a media playback device, just to name a few. If configured as a speaker, then the housing 899 may be configured as a variety of speaker types including but not limited to a left channel speaker, a right channel speaker, a center channel speaker, a left rear channel speaker, a right rear channel speaker, a subwoofer, a left channel surround speaker, a right channel surround speaker, a left channel height speaker, a right channel height speaker, any speaker in a 2.1, 3.1, 5.1, 7.1, 9.1 or other surround sound format including those having two or more subwoofers or having two or more center channels, for example. In other examples, housing 899 may be configured to include a display (e.g., DISP 880) for viewing video, serving as a touch screen interface for a user, providing an interface for a GUI, for example.

PROX system 813 may include one or more sensors denoted as SEN 895 that are configured to sense 897 an environment 898 external to the housing 899 of media device 100. Using SEN 895 and/or other systems in media device 100 (e.g., antenna 824, SPK 860, MIC 870, etc.), PROX system 813 senses 897 an environment 898 that is external to the media device 100 (e.g., external to housing 899). PROX system 813 may be used to sense one or more of proximity of the user or other persons to the media device 100 or other media devices 100. PROX system 813 may use a variety of sensor technologies for SEN 895 including but not limited to ultrasound, infrared (IR), passive infrared (PIR), optical, acoustic, vibration, light, ambient light sensor (ALS), IR proximity sensors, LED emitters and detectors, RGB LED's, RF, temperature, capacitive, capacitive touch, inductive, just to name a few. PROX system 813 may be configured to sense location of users or other persons, user devices, and other media devices 100, without limitation. Output signals from PROX system 813 may be used to configure media device 100 or other media devices 100, to re-configure and/or re-purpose media device 100 or other media devices 100 (e.g., change a role the media device 100 plays for the user, based on a user profile or configuration data), just to name a few. A plurality of media devices 100 in an eco-system of media devices 100 may collectively use their respective PROX system 813 and/or other systems (e.g., RF 807, de-tunable antenna 824, AV 809, etc.) to accomplish tasks including but not limited to changing configuration, re-configuring one or more media devices, implement user specified configurations and/or profiles, insertion and/or removal of one or more media devices in an eco-system, just to name a few.

In other examples, PROX 813 may include one or more proximity detection islands PSEN 877 as will be discussed in greater detail in FIGS. 5-6. PSEN 877 may be positioned at one or more locations on chassis 899 and configured to sense an approach of a user or other person towards the media device 100 or to sense motion or gestures of a user or other person by a portion of the body such as a hand for example. PSEN 877 may be used in conjunction with or in place of one or more of SEN 895, OPT 885, SPK 860, MIC 870, RF 807 and/or de-tunable 829 antenna 824 to sense proximity and/or presence in an environment surrounding the media device 100, for example. PSEN 877 may be configured to take or cause an action to occur upon detection of an event (e.g., an approach or gesture by a user U1-U4, P1-P2 or other) such as emitting light (e.g., via an LED), generating a sound or announcement (e.g., via SPK 860), causing a vibration (e.g., via SPK 860 or a vibration motor), display information (e.g., via DISP 880), trigger haptic feedback, for example. In some examples, PSEN 877 may be included in I/O 805 instead of PROX 813 or be shared between one or more systems of media device 100. In other examples, components, circuitry, and functionality of PSEN 877 may vary among a plurality of PSEN 877 sensors in media device 100 such that all PSEN 877 are not identical.

Figure 9:
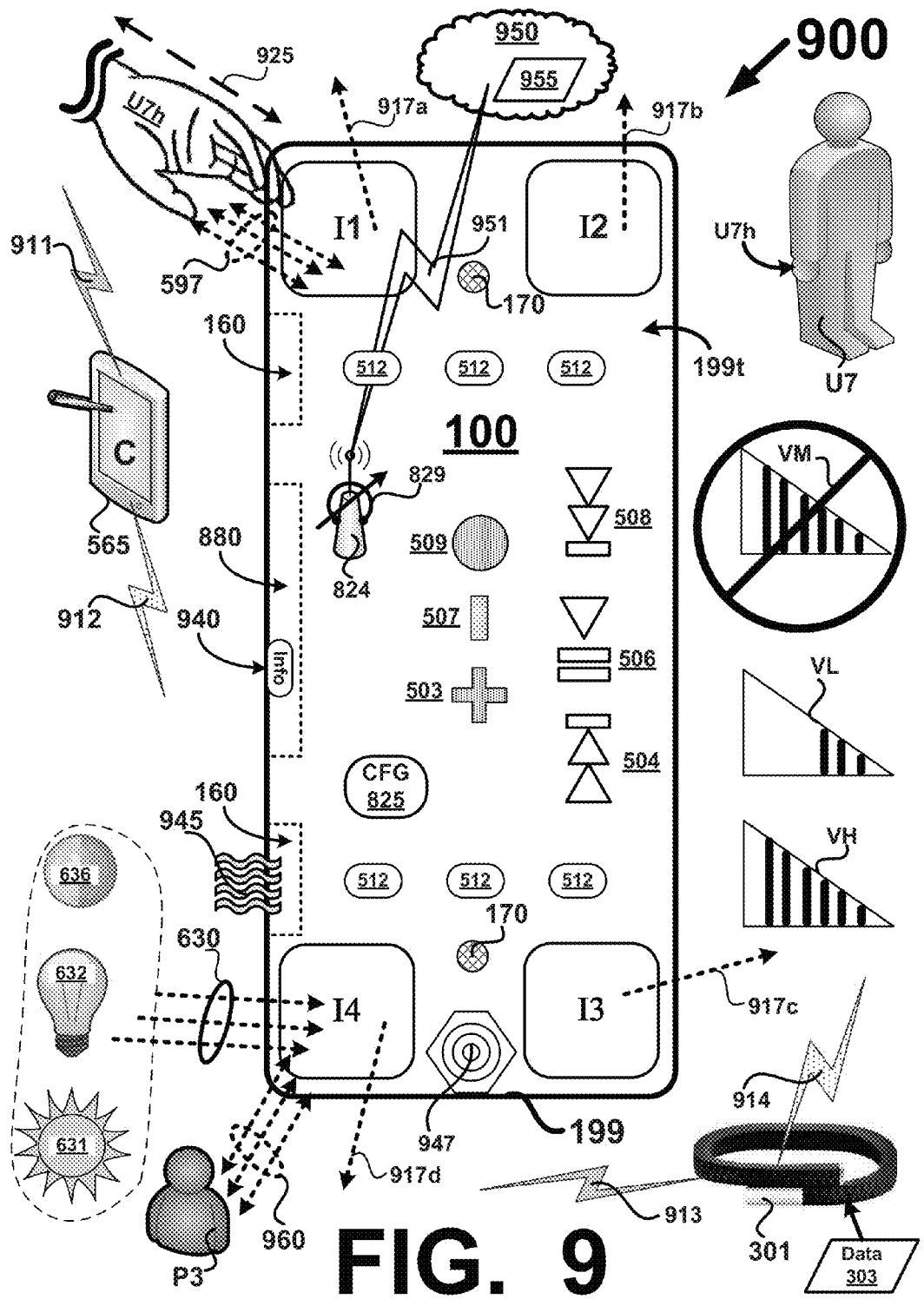
FIG. 9 is a top plan view of a media device including proximity detection islands and other systems configured to detect presence and take actions according to embodiments of the present application.

Attention is now directed to FIG. 9, where a top plan view 900 of media device 100 depicts four proximity detection islands 520 denoted as I1, I2, I3, and I4. Furthermore, control elements 503-512 are depicted on top surface 199*t*. In the example depicted, a hand U7h of a user U7 enters into proximity detection range of at least proximity detection island I1 and triggers generation of light (917*a-d*) from one or more of the islands (I1, I2, I3, I4) such as light 617 from RGB LED 616 of FIG. 6, for example. Presence detection by proximity detection island I1 may cause a variety of response from media device 100 including but not limited to signaling that presence has been detected using light (917*a-d*), generating sound 945 from SPK 160, generating a vibration from transducer or vibration engine 947, displaying information (info) 940 on DISP 880, capturing and acting on content C from user device 565, establishing wireless communications (912, 914) with user device 565 and/or 301, or other wireless device (e.g., a wireless router), just to name a few. Presence detection by proximity detection island I1 may cause media device 100 to notify user 901 that his/her presence has been detected and the media device is ready to receive input or some other action from user 901. Input and/or action from user 901 may comprise user 901 actuating one of the control elements 503-512, touching or selecting an icon displayed on DISP 880, issuing a verbal command or speech detected by MIC 170. Before, during, or after presence of user U7 is detected by proximity detection island I1, the RF system 807 may detect the RF signatures (911, 913) of wireless user devices 565 and/or 301 (e.g., using antenna 824, 829) and may take one or more actions as was described above.

As one example, upon detecting presence of user U7, media device 100 may emit light 917*c* from proximity detection island I3. If the user device 565 is present and also detected by media device 100 (e.g., via RF signature 911), then the media device 100 may indicate that presence of the user device 565 is detected and may take one or more actions based on detecting presence of the user device 565. If user device 565 is one that is recognized by media device 100, then light 917*c* from proximity detection island I3 may be emitted with a specific color assigned to the user device 565, such as green for example. Recognition of user device 565 may occur due to the user device 565 having been previously BT paired with media device 100, user device 565 having a wireless identifier such as a MAC address or SSID stored in or pre-registered in media device 100 or in a wireless network (e.g., a wireless router) the media device 100 and user device 565 are in wireless communications with, for example. DISP 880 may display info 949 consistent with recognition of user device 565 and may display via a GUI or the like, icons or menu selections for the user U7 to choose from, such as an icon to offer the user U7 a choice to transfer content C from user device 565 to the media device 100, to switch from BT wireless communication to WiFi wireless communication, for example. As one example, if content C comprises a telephone conversation, the media device 100 through instructions or the like in CFG 825 may automatically transfer (e.g., commandeer) the phone conversation from user device 565 to the media device 100 such that MIC 170 and SPK 160 are enabled so that media device 100 serves as a speaker phone or conference call phone and media device 100 handles the content C of the phone call. If the transfer of content C is not automatic, CFG 825 or other programming of media device 100 may operate to offer the user U7 the option of transferring the content C by displaying the offer on DISP 880 or via one of the control elements 503-512. For example, control element 509 may blink (e.g., via backlight) to indicate to user U7 that actuating control element 509 will cause content C to be transferred from user device 565 to media device 100. In other examples, post detection and post establishing the wireless communications link between device 301 and/or 565, the media device 100 may be configured to commandeer one or more functions as the appropriate action to take as was described above. For example, data 303 (e.g., an alarm and/or user biometric data) or a portion thereof may be harvested by media device 100 upon detection and wireless linking 914 with user device 301.

In some examples, control elements 503-512 may correspond to menu selections displayed on DISP 880 and/or a display on the user device 565. For example, control elements 512 may correspond to six icons on DISP 880 and user U7 may actuate one of the control elements 512 to initiate whatever action is associated with the corresponding icon on DISP 880, such as selecting a playlist for media to be played back on media device 100. Or the user U7 may select one of the icons 512' on DISP 880 to effectuate the action (e.g., selecting a song for playback).

As one example, if content C comprises an alarm, task, or calendar event the user U7 has set in the user device 301, that content C may be automatically transferred (e.g., commandeered) or transferred by user action using DISP 880 or control elements 503-512, to media device 100. Therefore, a wake up alarm set on user device 301 may actually be implemented on the media device 100 after the transfer, even if the user device 301 is powered down at the time the alarm is set to go off. When the user device 301 is powered up, any alarm, task, or calendar event that has not been processed by the media device 100 may be transferred back to the user device 301 or updated on the user device 301 so that a pending alarm, task, or calendar event may be processed by the user device 301 when it is not within proximity of the media device 100 (e.g., when user U7 leaves for a business trip). CFG 825 and APP 425 as described above may be used to implement and control content C handling between media device 100 and user devices, such as user device 301 and/or 565.

Some or all of the control elements 503-512 may be implemented as capacitive touch switches. Furthermore, some or all of the control elements 503-512 may be backlit (e.g., using LED's, light pipes, etc.). For example, control elements 512 may be implemented as capacitive touch switches and they may optionally be backlit. In some examples, after presence is detected by one or more of the proximity detection islands (I1, I2, I3, I4), one or more of the control elements 503-512 may be backlit or have its back light blink or otherwise indicate to user U7 960 that some action is to be taken by the user U7, such as actuating (e.g., touching) one or more of the backlit and/or blinking control elements 512. In some examples, proximity detection islands (I1, I2, I3, I4) may be configured to serve as capacitive touch switches or another type of switch, such that pressing, touching, or otherwise actuating one or more of the proximity detection islands (I1, I2, I3, I4) results in some action being taken by media device 100.

In FIG. 9, actions taken by media device 100 subsequent to detecting presence via proximity detection islands (I1, I2, I3, I4) and/or other systems such as RF 807, SEN 895, MIC 170, may be determined in part on ambient light conditions as sensed by ALS 618 in proximity detection islands (I1, I2, I3, I4). As one example, if ambient light 630 is bright (e.g., 631 or 632), then brightness of DISP 880 may be increased, light 917*a-d* from islands may be increased, and volume from SPK 160 may be nominal or increased because the ambient light 630 conditions are consistent with waking hours were light intensity and volume may not be a distraction to user U7. On the other hand, if ambient light 630 is dim or dark (e.g., 636), then brightness of DISP 880 may be decreased, light 917*a-d* from islands may be decreased, and volume from SPK 160 may be reduced or muted because the ambient light 630 conditions are consistent with non-waking hours were light intensity and volume may be a distraction to or startle user U7. Other media device 100 functions such as volume level, for example, may be determined based on ambient light 630 conditions (e.g., as detected by ALS 618 of island I4). As one example, under bright ambient light 630 conditions, volume VH of SPK 160 may be higher (e.g., more bars); whereas, under low ambient light 630 conditions, volume VL of SPK 160 may be lower (e.g., fewer bars) or may be muted entirely VM. Conditions other than ambient light 630 may cause media device 100 to control volume as depicted in FIG. 9.

In some examples, media device 100 may detect 960 a presence of a person P3 or other object in its environment 898. The presence detected may or may not occur with detection of a wireless user device. Nevertheless, media device 100 may take some action subsequent to detecting proximity of an object, such as person P3, for example. As one example, proximity detection island I4 detects 960 proximity of person P3 and may optionally emit light 917*d*, sound 945, vibration 947, or some combination thereof, to notify person P3 that media device 100 has detected P3 in its proximity range. Person P3 may have made a sound (e.g., speech or foot falls) detected by one of the MIC's 170, caused a change in light 630, created a vibration detected by an accelerometer or other sensor in media device 100, and the media device 100 may take some action based on having detected presence of person P3.

As one example, upon detecting person P3, media device 100 may take a pre-programmed action such as initiating playback of content (e.g., music, video, etc.) that is stored in media device 100 (e.g., resident in DS 803 in Flash 845). Display 880 may be activated to display a GUI that presents person P3 with content choices to select from, such as a playlist, a listing of content in a library, directory, or file system, etc. As another example, upon detecting person P3, media device 100 may take a pre-programmed action such as wirelessly accessing 951 data 955 from a resource 950 (e.g., the Cloud, NAS, or Internet). Data 955 may be content such as music, images, video, movies, Internet Radio, a Web page, news and information, just to name a few. Subsequent to being detected, person P3 may later activate a wireless user device and media device 100 may respond as described above by detecting the RF signature of the device, wirelessly linking with the device, and taking some action after the link is established.

Figure 10:
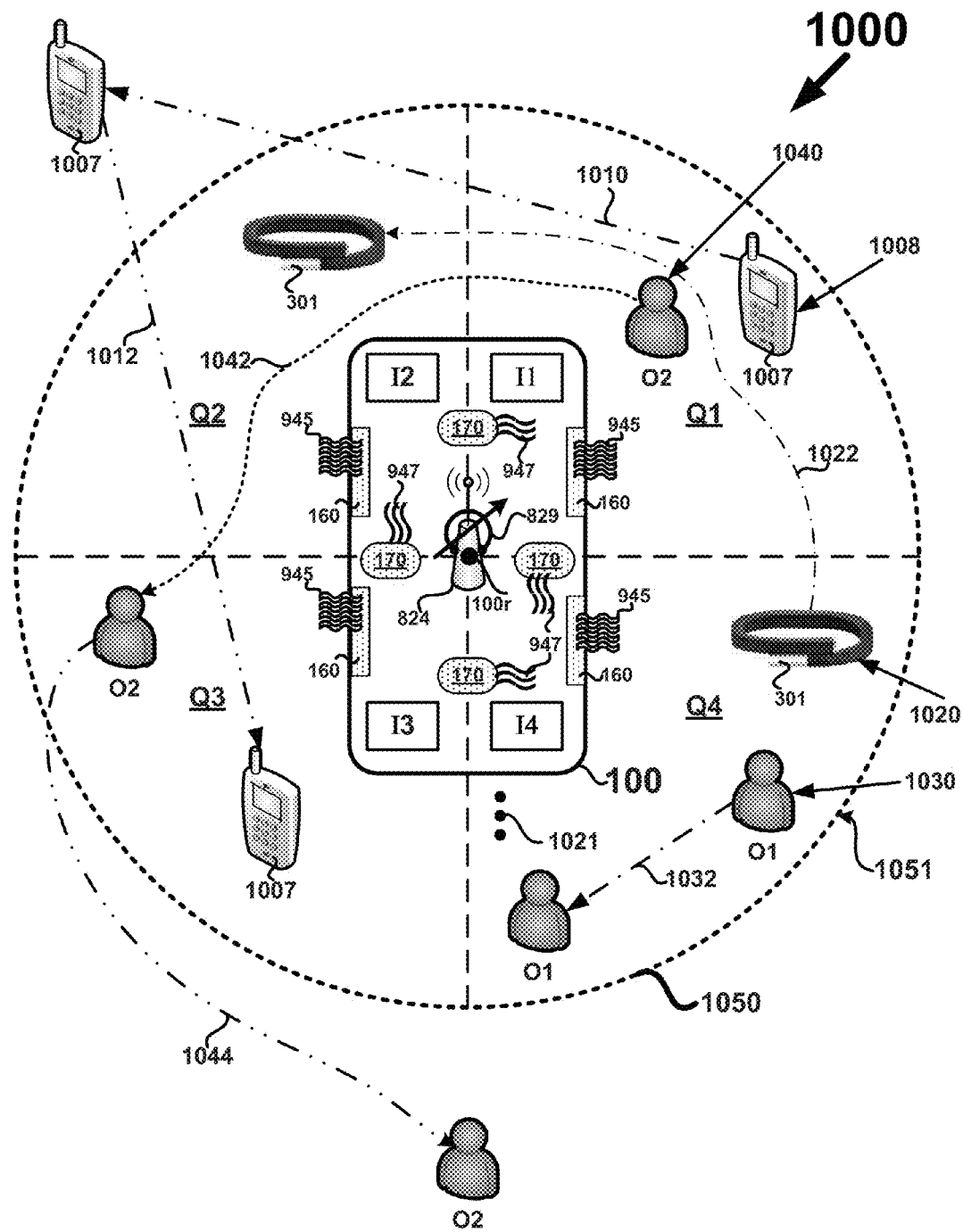
FIG. 10 depicts a diagram of one example of proximity detection, location, and movement of objects and wireless user devices relative to a media device according to embodiments of the present application.

Attention is now directed to FIG. 10, where a diagram 1000 includes at least one media device 100 and objects (e.g., users, persons) and wireless user devices in proximity of the media device 100. Although only one media device 100 is depicted there may be more than one as denoted by 1021. For purposes of explanation, an arbitrary coordinates system 1050 having four quadrants (Q1-Q4) and symmetrically positioned about an arbitrary reference point 100r of the media device 100 is depicted. Dashed line 1051 depicts a proximity detection boundary that may represent a maximum detection range for one or more systems in media device 100. In diagram 1000, a plurality of objects (O1-O2) and wireless user devices (301, 1007) are depicted; however, there may be more or fewer objects and wireless user devices than depicted. The various systems of media device 100 may be used to detect proximity, location, motion, distance, or other parameters of the various objects and wireless user devices relative to the media device 100.

Initially, wireless user device 1007 enters 1008 RF detection range in quadrant Q1 where it is subsequently detected by RF system 807 and the processes described above for detecting its RF signature, wirelessly linking with wireless user device 1007 and media device 100 taking some action subsequent to the linking may occur. Subsequently, wireless user device 1007 moves 1010 out of RF detection range (e.g., outside of 1051) adjacent to quadrant Q2 and the wireless communications link is deactivated and any commandeered functions are relinquished back to wireless user device 1007. Next, wireless user device 1007 moves 1012 back into RF detection range in quadrant Q3 where the RF detection, wireless linking, and commandeering, if any, may occur as described above. Here, it should be noted that presence of wireless user device 1007 via its RF signature is not the only sign of presence the media device 100 may use. A position (e.g., location and/or distance) of the wireless user device 1007 relative to the media device 100 (e.g., relative to 100r) may be determined using RF system 807 and antenna 824 and optionally its de-tuning 829 function. As wireless user device 1007 moves in, out, or around the quadrant's, RF system may use techniques including but not limited to analyzing RF signal strength and/or received signal strength indicator (RSSI) information from wireless transmissions from wireless user device 1007 to determine distance and relative location (e.g., an approximate bearing relative to 100r or some other point) of the wireless user device 1007 to media device 100. RF signal strength and/or RSSI information may be processed by media device 100 to determine that the wireless user device 1007 is out of RF range when it moves 1010 outside of 1050 adjacent to quadrant Q2. As wireless user device 1007 moves around relative to 100r, antenna 824 may be electrically de-tuned and a signal from the antenna processed to derive data indicative of location, distance, proximity, or other of wireless user device 1007.

More than one wireless user device may be in RF range of media device 100. Accordingly, in FIG. 10, another wireless user device 301 moves 1020 into RF detection range in quadrant Q4 where RF detection, wireless linking, and commandeering, if any, may occur as described above. Later, wireless user device 301 moves 1022 from quadrant Q4 to quadrant Q2. Movement 1022 has not removed the wireless user device 301 from RF detection range and the wireless communications link between wireless user device 301 and media device 100 remains intact.

Wireless user devices 301 and/or 1007 may have been introduced by users into proximity of the media device 100. In FIG. 10, objects O1 and O2 may represent users, persons, etc. who enter within detection range of media device 100. The various systems of media device 100 may detect proximity of objects O1 and O2 and may also approximately determine location, distance, or other relative to 100r. Proximity detection islands (I1, I2, I3, I4) may detect proximity of objects O1 and O2 in one or more of the quadrants, sound from objects O1 and O2 may be detected by one or more of the MIC's 170, one or more of SPK's 160 may emit sound 945 (e.g., ultrasound or other frequencies) and one or more of the MIC's 170 may receive reflected sound 947 from objects O1 and O2 (either stationary or in motion). One or more signals from those systems may be processed to determine proximity, distance, location, relative bearing, etc. relative to 100r of media device 100.

Object O1 may enter 1030 quadrant Q4 and be detected by proximity detection island I4, MIC 170, or by de-tuning 829 antenna 824. Later, object O1 may move 1032 within quadrant Q4 and may remain in quadrant Q4. Motion 1032 may be detected by proximity detection islands I3 and I4 and/or other systems in media device 100. In some examples, object O1 is a user and the user may have introduced 1020 wireless user device 301 into quadrant Q4. Later, object O1 and wireless user device 301 may move independently (1022 and 1032) of each other. Detection by multiple proximity detection islands may be due to overlapping detection patterns, as in the case where object O1 moved with Q4 and object O2 moved from Q1 to Q3. In some examples an object may move out of proximity detection range, such as object O2 moving 1044 from Q3 to outside of 1051 adjacent to quadrants Q3 and Q4, for example.

Object O2 may enter 1040 quadrant Q1 and be detected by proximity detection island I1, MIC 170, or by de-tuning 829 antenna 824. Later, object O2 may move 1042 from quadrant Q1, through quadrant Q2, and into to quadrant Q3 and may remain in quadrant Q3. Motion 1042 may be detected by proximity detection islands I1, I2 and I3 and/or other systems in media device 100. In some examples, object O2 is a user and the user may have introduced 1008 wireless user device 1007 into quadrant Q1. Later, object O2 and wireless user device 1008 may move independently (1012 and 1042) of each other.

Figure 11:
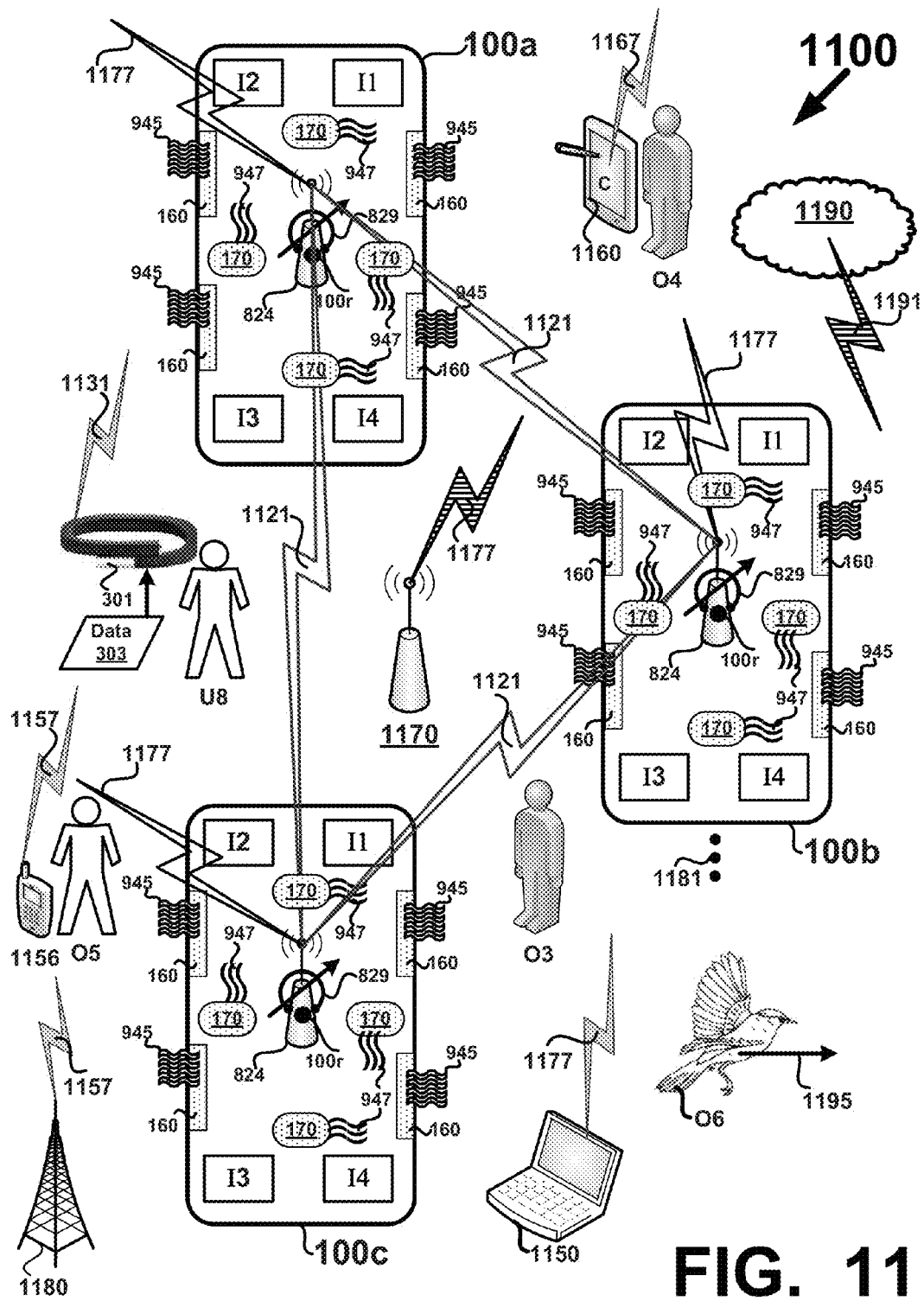
FIG. 11 depicts a block diagram of a plurality of media devices and wireless devices and objects/persons positioned in proximity of the media devices according to an embodiment of the present application.

FIG. 11 depicts a block diagram 1100 of a plurality of media devices (100a-100c) and wireless devices and objects/persons positioned in proximity of the media devices. Although three media devices are depicted, there may be more or fewer media devices as denoted by 1181. In FIG. 11, media devices (100a-100c) include the aforementioned RF systems, A/V systems, and proximity detection systems operative to detect presence, proximity, location, motion, etc. The configuration depicted in FIG. 11 provides one example of how proximity detection of one or more objects and one or more wireless user devices may be handled by a plurality of media devices 100 where some or all of those media devices 100 may be within proximity detection range of the objects and wireless user devices.

Media devices 100a-100c may be in wireless communications 1121 with one another using one or more of their respective RF transceivers. For example, wireless communications 1121 may comprise media devices 100a-100c using their respective BT radios 820 to wirelessly communicate among one another. As another example, wireless communications 1121 may comprise media devices 100a-100c using their respective AH radios 840 to wirelessly communicate among one another. The Ad hoc wireless communications may be advantageous when there are multiple media devices and optionally multiple objects and/or wireless user devices in that the AH radios 840 may be used to transmit data, status, and other information associated with each of the multiple media devices having detected proximity of objects and/or wireless user devices. As yet another example, wireless communications 1121 may comprise media devices 100a-100c using their respective WiFi radios 830 to wirelessly communicate among one another. Media devices 100a-100c may also user their WiFi radios 830 to wirelessly communicate 1177 with a wireless network 1170 and may communicate with one another by routing their wireless transmissions 1177 through the wireless network 1170.

In FIG. 11, there are numerous ways in which one or more of the media devices 100a-100c may handle proximity detection of the objects and wireless user devices positioned in their respective proximity detection ranges. The following examples are non-limiting and are intended to provide a non-exhaustive explanation of how the media devices may act and work in cooperation with one another in response to detecting the objects and wireless user devices positioned in proximity detection range of the media devices. As one example, object O4 and wireless user device 1160 enter into proximity of at least two of the media devices 100a and 100b such that proximity detection islands I1 and I4 on media device 100a and proximity detection islands I1 and I2 on media device 100b may detect proximity of object O4, and/or media devices 100a and 100b may use the acoustic means described above to detect O4. A wireless signature 1167 from wireless user device 1160 may be detected by all three media devices 100a-100c such that all three devices are aware of wireless user device 1160. As for taking action based on detecting proximity of O4 and wireless user device 1160, media devices 100a and 100b may be configured (e.g., via CFG 825) to arbitrate among themselves to determine which if any of the media devices 100a-100c will take one or more actions based on introduction of O4 and wireless user device 1160 into an ecosystem comprising the media devices 100a-100c. For purposes of explanation, assume RF signature 1167 is protocol compatible and also assume that all three media devices 100a-100c are aware of the presence of O4 and wireless user device 1160 and have arbitrated over their RF transceivers (e.g., using AH 840) to allow media device 100c to establish a wireless communications link with wireless user device 1160 and to take action(s) with respect to wireless user device 1160. Here, approximately at a time when wireless user device 1160 was detected, object O4 was enjoying content C on wireless user device 1160. As was described above, media device 100c commandeers handling of content C from wireless user device 1160 and playback of content C resumes on media device 100c. Media device 100c or any other of the media devices may wirelessly access 1191 the content C from resource 1190. In some examples, media devices 100a-100c may be pre-configured (e.g., via CFG 825) to designate one of the media devices as a master device and the other media devices accept the role of servant devices. The master device may act to establish the wireless communications link and take action, or the master device may assign those tasks to one or more of the servant devices.

Therefore, as a second example, media device 100c is designated as a master device, media devices 100a and 100b are servant devices and recognize 100c as the master device. Upon detection of RF signature 1167, master media device 100c delegates establishing the wireless communications link and taking action, if any, to servant media device 100a. Servant media device 100a may indicate to object O4 that its presence has been detected by issuing a visual, auditory, or vibration notification using its various systems, such as generating a color of light from RGB LED 616 in one of its proximity detection islands (see FIG. 6).

As a third example, an object O3 is detected by media devices 100b and 100c using any of the aforementioned systems. Taking no action at all is one of the actions a media device may choose, therefore, in this example, media devices 100b and 100c take no action in response to having detected proximity of O3. On the other hand, one or both of the media devices 100b and 100c may provide a notification to O3 that its presence has been detected using their respective proximity islands, display 880, or A/V system (e.g., SPK 860). For example, SPK 160 on media device 100b may be used to provide an audible notification to O3.

As a fourth example, an object O5 and wireless user device 1156 are detected by media device 100c. Wireless user device 1156 has RF signature 1157 that is detected by all of the media devices 100a-100c, but here media devices 100a and 100b are aware that 100c also detected proximity of O5 and the three media devices arbitrate among themselves and decide media device 100c will establish the wireless communications link with wireless user device 1156. The link is established and the action in this example is for media device 100c to commandeer a telephonic conversation from wireless user device 1156 and to handle the audio portions of the conversation using its SPK 160 and MIC 170 (e.g., serve as a speaker phone or conference call phone). Here, wireless user device 1156 may be in wireless communication 1157 with a wireless resource 1180 (e.g., a cell tower). Establishing the wireless communications link may comprise media device 100c and wireless user device 1156 using their respective BT radios to pair with each other. Alternatively, after establishing the wireless communications link, media device 100c may harvest data from wireless user device 1156 and use that data to establish a VoIP call using its WiFi 830 and wireless network 1170 to connect object O5 and the caller on the other end of the line with each other using a VoIP service or the like.

As a fifth example, media devices 100c and 100b may detect proximity of object O6 which may move 1195 into and then out of proximity range of media devices 100c and 100b. Media device 100c and/or 100b may signal an indication of detection of O6. Based on O6 moving into and then out of proximity range, or a speed at which O6 is traveling places O6 just briefly in proximity detection range of media devices 100c and 100b, media devices 100c and 100b may take no action in regard to having detected presence of O6. Alternatively, if O6 becomes stationary and/or remains in proximity range of 100c and/or 100b, then 100c and 100b may arbitrate with each other to determine what action to take and which media device will take the action. Here, media device 100c and 100b arbitrate and decide that device 100b may take action in regard to O6 and that action comprises 100b initiating playback of content of soothing sounds for O6 to hear. The content may be stored in DS 803 of 100b or 100b may wirelessly access the content via wireless network 1170 (e.g., from NAS) or from resource 1190.

As a sixth example, a user U8 and wireless user device 301 (e.g., a data capable strap band or the like) is detected by all of the media devices 100a-100c. Media devices 100a-100c detect RF signature 1131 from device 301. Wireless user device 301 has previously been previously BT paired with media device 100a. Here, the arbitration process between the media devices 100a-100c may include devices 100b and 100c deferring to 100a, even if 100a does not have master device status. Subsequently, media device 100a establishes the wireless communications link with wireless user device 301 and takes the action of harvesting at least a portion of data 303 carried by wireless user device 301. As was described above, data 303 may include biometric data about user U8, alarms set by U8, dietary information, calorie intake/expenditure, exercise information, sleep information, and other information/activities sensed or logged by wireless user device 301. Media device 100a may process data 303, act on data 303 (e.g., handle any alarms) or wirelessly transmit data 303 to resource 1190 or other location.

As a seventh example, media devices 100a-100c detect RF signature 1177 from wireless user device 1150. In this example, wireless user device 1150 is a laptop computer that is in wireless communication with wireless network 1170 (e.g., WiFi). Media devices 100a-100c are aware of 1150 and do not attempt to establish a wireless communications link with 1150 or attempt to commandeer any functions of 1150 because a user (not shown) of 1150 intends only for 1150 to wirelessly communicate with wireless network 1170. CFG 825 or other means may be included in media devices 100a-100c to instruct those devices to essentially ignore wireless user device 1150 and to take no actions in regards to it. Alternatively, a user of 1150 may activate its BT radio and media devices 100a-100c may detect the RF signature of the BT radio and may be configured to arbitrate which media device will establish the wireless communications link with 1150 (e.g., via BT paring) and take subsequent actions, if any. Here, media device 100b has master device status and commands device 100c to establish the wireless communications link with 1150 and take action, if any. In this example, the action taken by 100c is to commandeer the soundtrack portion of a movie being played back on 1150 and to playback the right audio channel on 100c, the left audio channel on 100a, and the center audio channel on 100b. Furthermore, media device 100c commands user device 1150 to switch from BT communications to WiFi communications (e.g., using WiFi 830) to obtain a higher wireless bandwidth for playing back the soundtrack content on media devices 100a-100c.

Figure 12:
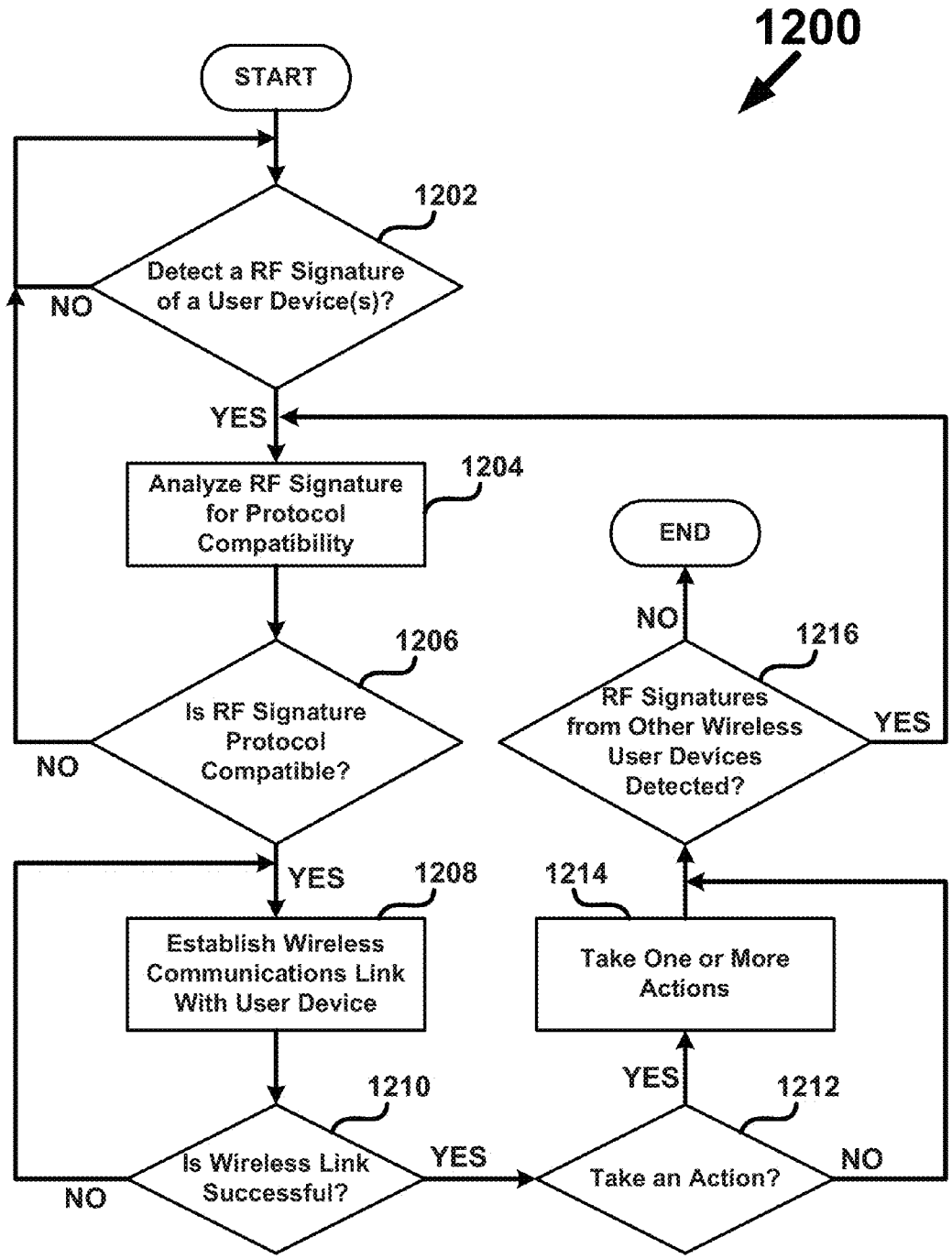
FIG. 12 is a flow diagram depicting one example of RF signature detection and action taking by a media device according to an embodiment of the present application.

Moving now to FIG. 12, a flow diagram 1200 depicts one example of RF detection and action taking by one or more media devices 100 as described above. At a stage 1202 media device 100 may use its RF system 807 to detect a RF signature from one or more wireless user devices. If no RF signatures are detected, then a NO branch may be taken and the process may recycle back to the stage 1202 to continue monitoring for RF signatures. If an RF signature is detected, then a YES branch may be taken to a stage 1204. At the stage 1204 the media device may use its RF system 807 and/or other systems (e.g., controller 801) to analyze the RF signature. At a stage 1206 a determination is made as to whether or not the RF signature, based on the analysis at stage 1204 is protocol compatible (e.g., BT, WiFi, Cellular) with one or more RF transceivers (e.g., 820, 830, 840, 850) of the media device 100. If the RF signature is not protocol compatible, then a NO branch may be taken to the stage 1202 where the media device 100 continues to attempt to detect RF signatures from wireless user devices. If the RF signature is protocol compatible, then a YES branch may be taken to a stage 1208 where the media device establishes a wireless communications link with the wireless user device. At a stage 1210 a determination is made as to whether or not the wireless communications link was successfully established. If the wireless communications link was not successfully established, then a NO branch may be taken to the stage 1208 to reattempt to establish the wireless communications link. On the other hand, if the wireless communications link was successfully established, then a YES branch may be taken to a stage 1212. At the stage 1212 a determination is made as to whether or not the media device 100, the wireless user device, or both will take some action, such as the actions described above. If no action is to be taken, then a NO branch may be taken to a stage 1216 as will be described below. If an action is to be taken, then a YES branch may be taken to a stage 1214 where one or more actions are taken by the media device, the wireless user device, or both. At a stage 1216 a determination is made as to whether or not RF signatures from other wireless media devices have been detected. If no other RF signatures have been detected, then a NO branch is taken and the process 1200 may terminate. If other RF signatures have been detected, then a YES branch is taken to the stage 1204 where the RF signatures are analyzed as described above and the process 1200 may continue through the other stages as described above.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A media device, comprising:
a controller in electrical communication with systems including
a data storage system including configuration data associated with configuring the media device,
a radio frequency (RF) system including at least one RF antenna configured to be selectively electrically de-tunable, the RF antenna electrically coupled with a plurality of RF transceivers that communicate using different wireless protocols,
an audio/video (AN) system including at least one loudspeaker electrically coupled with a power amplifier and at least one microphone electrically coupled with a preamplifier,
wherein the RF system is configured to detect a RF signature, a RF signal strength, or both of one or more other wireless devices including a wireless activity monitoring and reporting device configured to be worn by a user, the data comprises alarm data set by the user for execution by the wireless activity monitoring and reporting device, and the controller commandeers execution of the alarm using the alarm data only when the wireless activity monitoring and reporting device is within a first proximity distance of the media device, the RF system configured to electrically de-tune the RF antenna to determine proximity, location, or both of the one or more other wireless devices, and
wherein the controller is configured to process the RF signature, the RF signal strength, or both, to determine the proximity, the location, or both of the one or more other wireless devices relative to the media device, the controller being configured to process the RF signature including establishing a wireless communications link with the one or more other wireless devices using the RF system, the controller being further configured to harvest data from the one or more other wireless devices using the wireless communications link.
2. The media device of claim 1, wherein the RF system is configured to process received signal strength indicator (RSSI) information from the RF signature, the RSSI information used by the controller in determining the proximity, the location, or both.

3. The media device of claim 1, wherein the RF system further comprises an Ad Hoc (AH) transceiver configured to wirelessly communicate only with other wireless media devices having AH transceivers.

4. The media device of claim 1, wherein the wireless communications link comprises one or more wireless protocols selected from the group consisting of Bluetooth (BT), wireless network (WiFi), wireless broadband (WiMAX), near field communication (NFC), and Cellular.

5. The media device of claim 1, wherein the wireless activity monitoring and reporting device is configured to be worn, and the data comprises user activity data collected by the wireless activity monitoring and reporting device.

6. The media device of claim 1, wherein the controller relinquishes execution of the alarm back to the wireless activity monitoring and reporting device when the wireless activity monitoring and reporting device is not within the first proximity distance of the media device.

7. The media device of claim 1, wherein the wireless activity monitoring and reporting device is configured to be worn, and the data comprises biometric data collected by the wireless activity monitoring and reporting device.

8. The media device of claim 1 and further comprising: a proximity sensing system configured to sense an environment external to the wireless media device and detect a presence in proximity of the media device using a selected one or more of acoustic, optical, vibration, or non-contact temperature sensors.

9. The media device of claim 8, wherein the proximity sensing system is positioned in at least one proximity detection island connected with the media device.

10. The media device of claim 1, wherein the presence comprises one or more animate objects.

11. The media device of claim 1, wherein the RF system passively detects the RF signature, the RF signal strength, or both.

* * * * *